United States Patent
Kim et al.

(10) Patent No.: US 12,056,351 B2
(45) Date of Patent: Aug. 6, 2024

(54) DATA MANAGEMENT SYSTEM USING BITMAP BASED TRIM COMMAND

(71) Applicant: Samsung Electronics Co., Ltd., Suwon-si (KR)

(72) Inventors: Hyeju Kim, Seongnam-si (KR); Jeongeun Kim, Seongnam-si (KR); Sunmi Yoo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 191 days.

(21) Appl. No.: 17/884,689

(22) Filed: Aug. 10, 2022

(65) Prior Publication Data

US 2023/0152968 A1 May 18, 2023

(30) Foreign Application Priority Data

Nov. 15, 2021 (KR) .......................... 10-2021-0156417
Jan. 19, 2022 (KR) .......................... 10-2022-0008005

(51) Int. Cl.
*G06F 3/06* (2006.01)

(52) U.S. Cl.
CPC .......... *G06F 3/0604* (2013.01); *G06F 3/0656* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Nam et al. | |
| 8,654,587 B2 | 2/2014 | Yoon et al. | |
| 9,032,138 B2 | 5/2015 | Choi et al. | |
| 9,519,496 B2 * | 12/2016 | Starks | G06F 3/0673 |
| 9,529,705 B2 | 12/2016 | Kim et al. | |
| 10,019,362 B1 * | 7/2018 | Chatterjee | G06F 12/0893 |
| 10,061,708 B2 * | 8/2018 | Huang | G06F 12/0246 |
| 10,268,385 B2 * | 4/2019 | Huang | G06F 3/0679 |
| 10,482,012 B1 | 11/2019 | Gordon | |

(Continued)

FOREIGN PATENT DOCUMENTS

| | | |
|---|---|---|
| KR | 20130057306 A | 5/2013 |
| KR | 101735065 B1 | 5/2017 |
| KR | 101824949 B1 | 2/2018 |

*Primary Examiner* — Christopher D Birkhimer
(74) *Attorney, Agent, or Firm* — Myers Bigel, P.A.

(57) ABSTRACT

A storage device includes a memory device storing a lower-level bitmap indicating whether or not logical sectors are invalid in a host, and an upper-level bitmap indicating whether or not logical groups each including consecutive logical sectors are invalid, and a controller that controls the memory device and including a log buffer. The controller may receive a trim command for one or more target logical sectors from the host and determine using the upper-level bitmap whether or not one or more target logical groups including the target logical sectors are invalid, store a trim log including address information of target logical sectors included in a target logical group that is not invalid in the log buffer and refrain from storing a trim log for target logical sectors included in a target logical group that is invalid, and invalidate the target logical sectors.

20 Claims, 19 Drawing Sheets

(56) References Cited

U.S. PATENT DOCUMENTS

| | | | |
|---|---|---|---|
| 2011/0099326 A1* | 4/2011 | Jung | G06F 3/0679 |
| | | | 711/E12.001 |
| 2011/0233648 A1 | 9/2011 | Seol et al. | |
| 2013/0132650 A1* | 5/2013 | Choi | G06F 12/0246 |
| | | | 711/103 |
| 2013/0275660 A1 | 10/2013 | Bennett | |
| 2014/0089264 A1* | 3/2014 | Talagala | G06F 3/0679 |
| | | | 707/649 |
| 2014/0089265 A1* | 3/2014 | Talagala | G06F 16/22 |
| | | | 707/674 |
| 2016/0371034 A1* | 12/2016 | Kang | G06F 13/28 |
| 2017/0192851 A1* | 7/2017 | Per | G06F 16/11 |
| 2019/0369892 A1* | 12/2019 | Huang | G06F 3/0679 |

\* cited by examiner

DATA MANAGEMENT SYSTEM USING BITMAP BASED TRIM COMMAND

CROSS-REFERENCE TO RELATED APPLICATIONS

This application claims the benefit under 35 U.S.C. § 119(a) of Korean Patent Application No. 10-2021-0156417, filed on Nov. 15, 2021, and Korean Patent Application No. 10-2022-0008005, filed on Jan. 19, 2022, in the Korean Intellectual Property Office, with the entire disclosures of the above-identified applications incorporated by reference herein for all purposes.

TECHNICAL FIELD

The present disclosure relates to storage devices, and in particular to storage devices including non-volatile memory devices.

A storage device that uses a memory device (e.g., a non-volatile memory device) has advantages, such as excellent stability and durability, a very fast information access speed, and low power consumption because there is no mechanical driving part. Examples of storage devices having such advantages include universal serial bus (USB) memory devices, memory cards having various interfaces, solid state drives (SSDs), and the like.

When a certain file is deleted in a host, it will be processed as a deleted file by a file system, such as a file system of the host. The deletion of the file means that metadata of the deleted file has been changed. Even in the case that the file is deleted in the host, that is, even in the case that the metadata of the deleted file is changed by the file system, the storage device may not be capable of deciding whether or not data stored in the storage device is data on an invalid file. For this reason, a merge operation, a garbage collection operation, or the like, may be performed on the data of the invalid file in the storage device. Such an operation will hinder operation performance of the storage device. In addition, since the invalid file is stored as if it is valid data, an effective storage space of the storage device will be decreased. Accordingly, the host may provide a trim command to the storage device in order to notify the storage device of invalidation of files, if necessary.

SUMMARY

Some aspects of the present disclosure provide storage devices capable of decreasing a latency of a trimming operation.

Some aspects of the present disclosure provide storage devices capable of alleviating decreases in lifespan of memory devices and decreases in input/output performance of storage devices accompanying trimming operations.

According to some example embodiments, a storage device may include a memory device that may store a lower-level bitmap that indicates whether or not logical sectors are invalid in a host and an upper-level bitmap that indicates whether or not logical groups are invalid, each logical group including a plurality of consecutive logical sectors. The storage device may include a controller that may control the memory device and that may include a log buffer. The controller may retrieve the lower-level bitmap and the upper-level bitmap from the memory device, receive a trim command for one or more target logical sectors from the host and determine, based on the upper-level bitmap, whether or not one or more target logical groups that include the target logical sectors are invalid, store in the log buffer a trim log including address information of target logical sectors included in a target logical group that is determined to be not invalid and refrain from storing in the log buffer a trim log for target logical sectors included in a target logical group that is determined to be invalid, invalidate the target logical sectors and provides a complete response to the trim command to the host; and store trim logs stored in the log buffer in the memory device.

According to some example embodiments, a storage device includes a memory device configured to store data, and a controller configured to control the memory device, layer a logical address space used in a host into upper regions and lower regions, each upper region comprising a plurality of lower regions, and store validity state information for each upper region indicative of whether or not all of the lower regions included in the upper region are valid or not valid. The controller is configured to determine, using the validity state information for each upper region, a first upper region of the upper regions that is invalid and that includes a target logical address region to which a trimming operation is to be performed, and store in the memory device a trim log including address information based on a determination that the target logical address region also addresses a second upper region, and perform the trimming operation by inactivating the target logical address region.

According to some example embodiments, a storage device may include a memory device configured to store a lower-level bitmap indicating whether or not logical sectors are invalid in a host and an upper-level bitmap indicating whether or not logical groups each including consecutive logical sectors are invalid, and a controller configured to control the memory device and including a log buffer. The controller may be configured to receive a sanitize command for an entire user region of the memory device from the host and performs a deletion operation on the entire user region, scan the upper-level bitmap loaded from the memory device to find one or more logical groups that are not invalid and generate trim logs for the one or more logical groups, and invalidate all of the logical sectors, provide a completion response to the sanitize command to the host, and store the generated trim logs in the memory device.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, some example embodiments of the inventive concepts of the present disclosure will be described with reference to the accompanying drawings.

Figure 1:
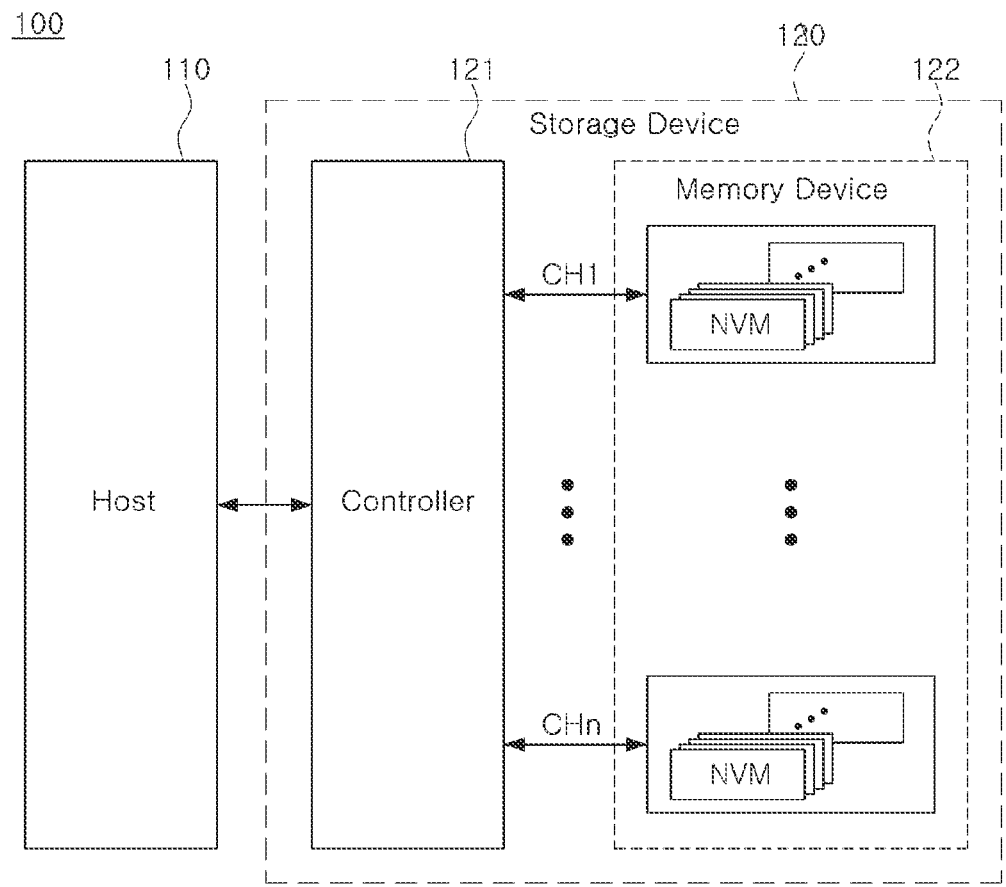
FIG. 1 is a block diagram illustrating a user device according to some example embodiments.

FIG. 1 is a block diagram illustrating a user device according to some example embodiments. A user device 100 illustrated in FIG. 1 may include a host 110 and a storage device 120.

The host 110 may control the storage device 120. The host 110 may include a mobile electronic device, such as a computer, a personal digital assistant (PDA), a portable media player (PMP), a MP3 player, a camera, a camcorder, and a mobile phone, as non-limiting examples. The host 110 may notify the storage device 120 of invalidation of files, if necessary. That is, if a file is invalidated by the host 110, the host 110 may notify the storage device 120 of the invalidation of the file 120. This may be achieved by transmitting a specific command from the host 110 to the storage device 120. This specific command may be known as a trim command. The trim command may include address information for designating a region to be deleted.

Processing of metadata for a file to be deleted may be performed by a file system (not illustrated) of the host 110. The file system may not delete contents of the file, but may change only the metadata of the file (e.g., change the metadata of the file indicate that the file is a deleted file), for the purpose of a fast operation. When the metadata of the deleted file is changed, the contents of the deleted file may be processed as invalid data in the file system of the host 110, whereas the content of the deleted file may remain as valid data in the storage device 120.

For this reason, the storage device 120 will recognize a memory block including the data of the deleted file as a valid block. Accordingly, an unnecessary operation such as a merge operation or a garbage collection operation for the deleted data may be performed in the storage device 120. In order to prevent such a problem, the host 110 may provide the trim command to the storage device 120 so that the contents of the deleted file are invalidated.

Continuing to refer to FIG. 1, the storage device 120 may include a memory device 122 capable of retaining stored data even in the case that power is interrupted. The memory device 122 may be a non-volatile memory. The storage device 120 may be, for example, a solid-state drive (SSD) or a memory card. However, the storage device 120 is not limited to the SSD or the memory card.

The memory device 122 may include a plurality of flash memories, with the understanding that the present disclosure is not limited thereto. The memory device 122 may include other non-volatile memories (e.g., a phase-change random access memory (PRAM), a ferroelectrics random access memory (FRAM), a magnetic random access memory (MRAM), etc.) in addition to or instead of the flash memory. The non-volatile memories constituting the memory device 122 may store data of one bit or data of two bits or more per memory cell. In addition, the non-volatile memories constituting the memory device 122 may have a memory cell array having a three-dimensional structure.

The storage device 120 may include a controller 121, which may control the memory device 122 in response to a request from the host 110. The controller 121 may transmit and receive signals to and from the memory device 122 through a plurality of channels CH1 to CHn.

The controller 121 may include one or more hardware devices (not illustrated), such as a central processing unit and a memory, and one or more hardware and/or software devices (not illustrated) for performing an invalidation operation in response to the trim command of the host 110. In some embodiments, the central processing unit and memory of the controller 121 may be configured to perform the invalidation operation in response to the trim command of the host 110.

A logical address space used in the file system of the host 110 may include a plurality of logical sectors. The controller 121 may manage an invalid sector bitmap indicating whether or not the plurality of logical sectors are invalid. For example, the controller 121 may manage an invalid sector bitmap that indicates validity state information, e.g., whether each of the plurality of logical sectors is valid or invalid. When a trim command for logical sectors having a certain logical address range is received from the host 110, the controller 121 may indicate that the logical sectors have been invalidated by setting bits corresponding to the logical sectors in the invalid sector bitmap.

It may be desirable (and may be necessary) to preserve information indicating which logical sectors are invalid sectors even when the storage device 120 is powered off. Accordingly, the controller 121 may store the invalid sector bitmap in the memory device 122 to preserve the invalid sector bitmap in the memory device 122 even when the storage device 120 is powered off. In addition, the controller 121 may load the invalid sector bitmap into the controller 121 when the storage device 120 is booted.

Meanwhile, the storage device 120 may need to ensure integrity for a command of the host 110. For example, once a trim command for certain logical sectors is received from the host 110, even in the case that the storage device 120 is abnormally terminated in a state in which a trim sector bitmap of the memory device 122 has not been yet updated, it may need to be ensured that the logical sectors will be invalidated.

The controller 121 may periodically log a change in the invalid sector bitmap to the memory device 122 in order to ensure integrity of the storage device 120. For example, when the trim command is received, the controller 121 may generate a trim log including address information of the logical sectors and store the trim log in the memory device 122. When the supply of power is resumed after the storage device 120 is abnormally terminated, the controller 121 may restore an invalid sector bitmap to the latest state using the invalid sector bitmap and the trim log stored in the memory device 122.

In some cases, the controller 121 may need to perform a trimming operation on the entire logical address space according to a request from the host 110. When the controller 120 needs to generate trim logs for the entire logical address space, an amount of the trim logs to be stored in the memory device 122 may increase. When the amount of the trim logs increases, a time required to store the trim logs in the memory device 122 may increase, and resultantly, latency of the trimming operation may increase.

According to some example embodiments, the controller 121 may layer and manage a bitmap indicating whether or not the logical address space is invalid into and as a lower-level bitmap and an upper-level bitmap. When the controller 121 performs a trimming operation on certain target logical sectors, the controller 121 may determine whether or not the target logical sectors are invalid with reference to the upper-level bitmap. When logical sectors to be trimmed are already invalidated sectors, the controller 121 may complete the trimming operation without storing trim logs for the logical sectors.

According to some example embodiments, the amount of the trim logs to be stored in the memory device 122 may decrease when the trimming operation is performed. Accordingly, the latency of the trimming operation may decrease, and a lifespan of the memory device 122 may be improved.

Figure 2:
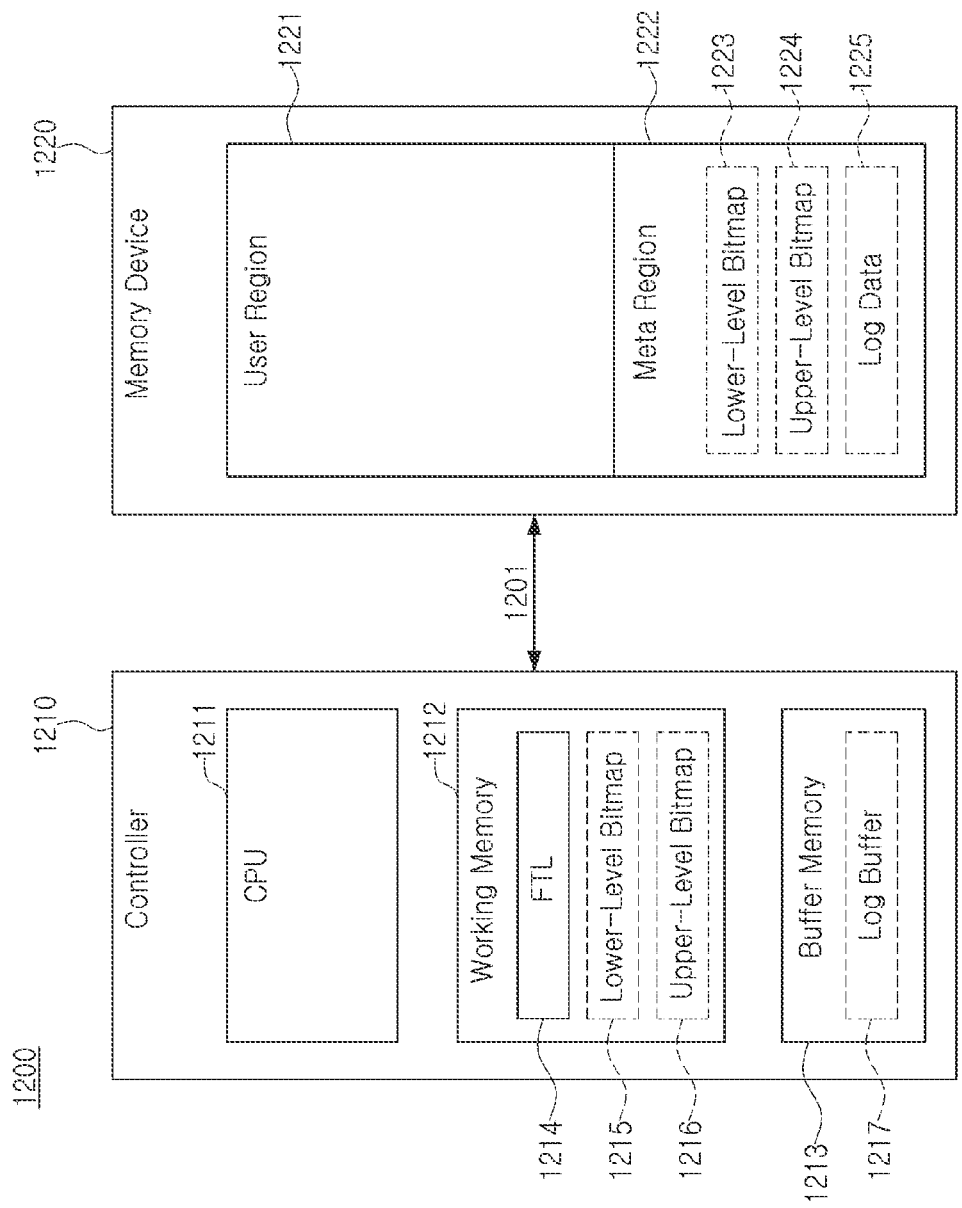
FIG. 2 is an illustrative block diagram of a storage device capable of performing an invalidation operation in response to a trim command from a host.

FIG. 2 is an illustrative block diagram of a storage device capable of performing (or configured to perform) an invalidation operation in response to a trim command from a host. A storage device 1200 illustrated in FIG. 2 may indicate whether or not the logical address space has been invalidated using an upper-level bitmap and a lower-level bitmap, as described above.

Referring to FIG. 2, the storage device 1200 may include a controller 1210 and a memory device 1220. The memory device 1220 may be a flash memory device. As non-limiting examples, the storage device 1200 may be a memory card device, a solid state drive (SSD) device, an advanced technology attachment (ATA) bus device, a serial ATA (SATA) bus device, a multimedia card device, a secure digital (SD) device, a memory stick device, a hybrid drive device, or a universal serial bus flash device.

The memory device 1220 may be connected to the controller 1210 through an address/data bus. In the memory device 1220, an erase operation may be performed in units of memory blocks (e.g., on a block by block basis), and a read or write operation may be performed in units of pages (e.g., on a page by page basis). There may be a plurality of pages per block. In the memory device 1200, the erase operation may be performed 1220 before the write operation. Even in the case that data stored in the memory device 1220 is invalidated on the host, the data may be substantially retained as it is due to characteristics of the memory device 1220 that does not support overwriting. This is because the host does not manage a physical region of the memory device 1220, and manages only mapping information through a flash transition layer (FTL).

The memory device 1220 may be divided into a user region 1221 and a meta region 1222. General user data such as host data may be stored in the user region 1221, and metadata that is separate from the user data and used and/or required for driving the memory device 1220 or the storage device 1200 may be stored in the meta region 1222. For example, map data by the FTL may be stored in the meta region 1222, and as illustrated in FIG. 2, a lower-level bitmap 1223, an upper-level bitmap 1224, log data 1225, and the like, may be further stored in the meta region 1222.

The controller 1210 may exchange data with the memory device 1220 through the address/data bus. The controller 1210 may include a CPU 1211, a working memory 1212, and a buffer memory 1213. When the controller 1210 receives a trim command for certain target logical sectors from the host, the controller 1210 may selectively store a trim log for the target logical addresses.

The CPU 1211 may be a commercially available or customized microprocessor. The working memory 1212 may include, as non-limiting examples, a cache, a read only memory (ROM), a programmable ROM (PROM), an erasable programmable ROM (EPROM), an electrically erasable programmable ROM (EEPROM), a flash, a static random access memory (SRAM), and/or a dynamic random access memory (DRAM). The working memory 1212 may store a flash transition layer 1214 driven by the CPU 1211, and may store a lower-level bitmap 1223 and an upper-level bitmap 1224 loaded from the memory device 1220. The working memory may store the lower-level bitmap 1223 and upper-level bitmap 1224 locally (lower-level bitmap 1215 and upper-level bitmap 1216).

The flash transition Layer (FTL) 1214 may allow the memory device 1220 to be used more efficiently. The FTL 1214 may serve to transition a logical address provided from the host into a physical address usable by the memory device 1220. The FTL 1214 may manage such address transition through a mapping table.

In addition, the allowable number (e.g., about 100,000) of times of erase of the memory device 1220 may be predetermined. The memory device 1220 may distribute an erase operation to all memory blocks in order to prevent a specific memory block from being worn faster than other memory blocks. This is called wear level management. The FTL 1224 may be used to manage a wear level of the memory device 1220.

The lower-level bitmap 1215 and the upper-level bitmap 1216 may be managed by the FTL 1214. The lower-level bitmap 1215 and the upper-level bitmap 1216 may layer and manage information indicating whether or not the logical address space is invalid. For example, the logical address space may be mapped to a plurality of logical addresses. A logical region mapped to one logical address may be referred to as a logical sector. The lower-level bitmap 1215 may include bits indicating whether or not each logical sector is invalid. In other words, each bit of the lower-level bitmap 1215 may indicate, via a single bit, a validity state of a respective logical sector. A plurality of logical sectors having consecutive logical addresses may constitute a logical group, or, stated differently, a logical group may comprise a plurality of logical sectors having consecutive logical addresses. The upper-level bitmap 1216 may include bits indicating whether or not each logical group is invalid. In other words, each bit of the upper-level bitmap 1216 may indicate, via a single bit, a validity state of a respective logical group. If the logical group is invalid (e.g., if the upper-level bitmap 1216 indicates that a logical group is invalid), then all logical sectors of the logical group may be considered to be invalid. Conversely, if the logical group is valid (e.g., if the upper-level bitmap 1216 indicates that a logical group is valid), then at least one logical sector of the logical group may be considered to be valid.

The buffer memory 1213 may buffer data to be stored in the memory device 1220 or data read from the memory device 1220. The buffer memory 1213 may include a log buffer 1217 buffering log data generated by the FTL 1214 as well as the trim logs described above. When the log buffer 1217 is full of the log data, the CPU 1211 may store the log data stored in the log buffer 1217 in the memory device 1220. FIG. 2 illustrates the log data 1225 stored in the memory device 1220.

If the FTL 1214 layers and manages information indicating whether or not the logical address space is invalid, when a trim command for target logical sectors has been received, it may be quickly confirmed whether or not the target logical sectors have been already invalidated with reference to the upper-level bitmap 1216. When the target logical sectors have already been invalidated, the FTL 1214 may skip an operation of storing a trim log for the target logical sectors.

According to some example embodiments, an amount of log data generated by the trimming operation may be decreased, and an amount of log data stored in the memory device 1220 may thus decrease. Accordingly, a lifespan of the memory device 1220 may be improved, and trim latency may be decreased.

Figure 3:
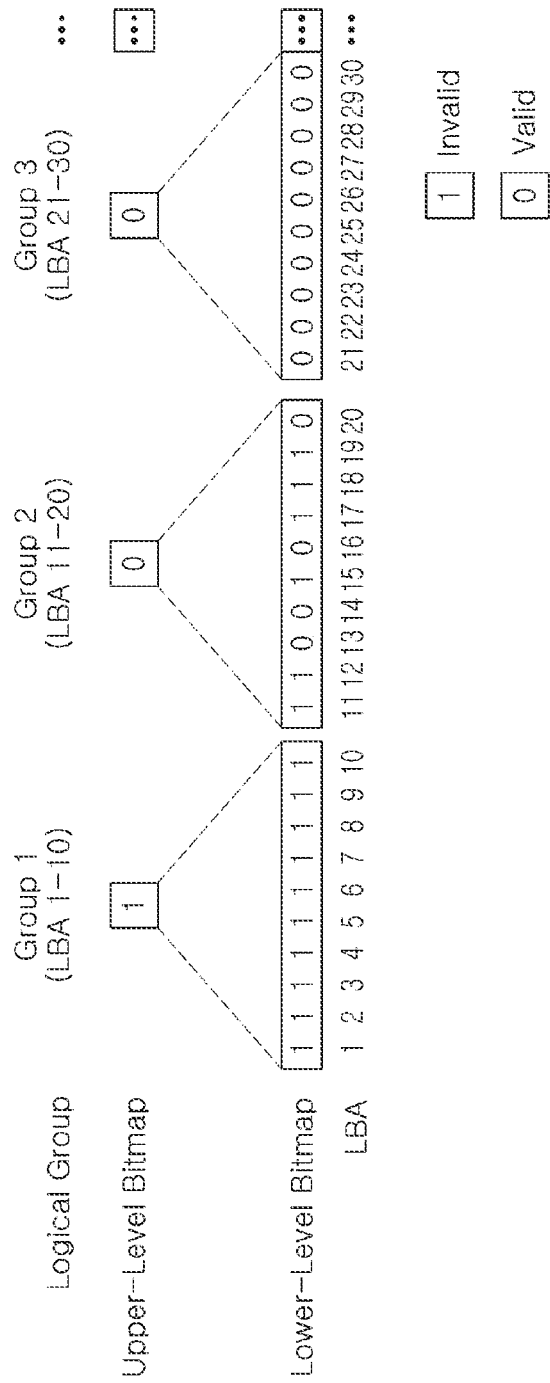
FIG. 3 is a diagram illustrating an upper-level bitmap and a lower-level bitmap according to some example embodiments.

FIG. 3 is a diagram illustrating an upper-level bitmap and a lower-level bitmap according to some example embodiments.

Referring to FIG. 3, a logical address space used in the file system of the host may include a plurality of logical sectors, and the logical address space may be divided into a plurality of logical groups. For example, FIG. 3 illustrates first to third logical groups Group1 to Group3.

Each logical group may include a plurality of logical sectors having consecutive logical addresses, such as logical block addresses (LBAs). For example, the first logical group Group1 may include ten logical sectors having logical block addresses LBA1 to LBA10. Similarly, the second logical group Group2 may include logical sectors having LBA11 to LBA20, and the third logical group (Group3) may include logical sectors having LBA21 to LBA30. It is only an example that the number of logical sectors included in the logical group is ten, and the present disclosure is not limited thereto. For example, one logical sector may be mapped to data of 4 KB, and one logical group may correspond to a logical region of 2 GB including $2^{19}$ consecutive logical sectors. As another example, one logical sector may be mapped to data of 512 B, and one logical group may correspond to a logical region of 2 GB including $2^{21}$ consecutive logical sectors.

Bits of the lower-level bitmap may indicate whether or not each of the logical sectors is invalid. That the valid logical sector is valid may indicate that the logical sector is storing valid file data in the file system of the host. In addition, that the logical sector is invalid may indicate that the logical sector does not store data or is currently storing data of an invalid file.

When a certain bit of the lower-level bitmap has a value of '1', it may indicate that a logical sector corresponding to the certain bit is invalid, and when a certain bit of the lower-level bitmap has a value of '0', it may indicate that a logical sector corresponding to the certain bit is valid. This is only an example, and in some embodiments and according to implementation a value of '0' of the bit may indicate an invalid sector and a value of '1' of the bit may indicate a valid sector.

Bits of the upper-level bitmap may indicate whether or not each of the logical groups is invalid. A bit value '1' of the upper-level bitmap may indicate that a logical group corresponding to the bit is invalid. For example, when all of bit values corresponding to logical sectors of LBA1 to LBA10 in the lower-level bitmap are '1', the first logical group Group1 may be invalid, and a bit value corresponding to the first logical group Group1 may be set to '1.' When at least one of the logical sectors included in the logical group is a valid sector, the logical group may be valid, and a bit value of the logical group in the upper-level bitmap may be set or cleared to '0.' For example, at least one bit of the constituent logical sectors constituting the second and third logical groups Group2 and Group3 in the lower-level bitmap may have a value of '0.' In this case, bit values of the second and third logical groups Group2 and Group3 in the upper-level bitmap may be cleared to '0.'

According to some example embodiments, the controller may decide whether or not the target logical sectors have already been invalidated by confirming the upper-level bitmap before performing the trimming operation on the target logical sectors. In addition, the controller may skip an operation of storing the trim log for the target logical sectors according to a decision result.

Figure 4:
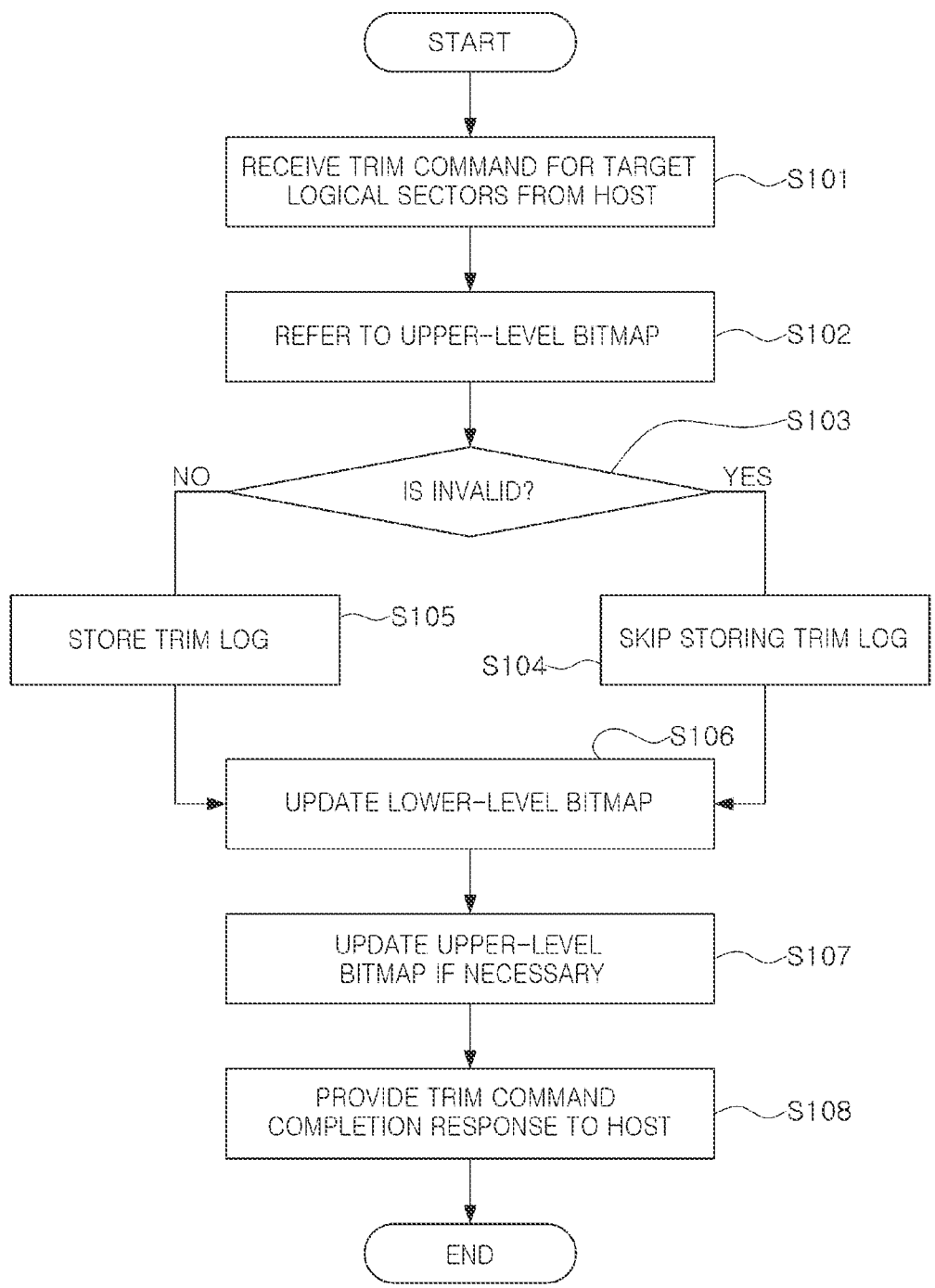
FIG. 4 is a flowchart illustrating aspects of trimming operations of a controller according to some example embodiments.

FIG. 4 is a flowchart illustrating aspects of trimming operations of a controller according to some example embodiments.

Referring to FIG. 4, in operation S101, the controller may receive a trim command for one or more target logical sectors from the host. For example, the host may provide information on a logical address range indicating target logical sectors to be invalidated to the storage device together with the trim command. According to some embodiments, and/or according to implementation, the information on the logical address range may include a start LBA and an end LBA among logical addresses of the target logical sectors. The logical address range may be associated with one or more logical groups.

In operation S102, the controller may refer to bits belonging to one or more target logical groups including the target logical sectors in the upper-level bitmap. Then, in operation S103, the controller may decide whether or not the one or more target logical groups are invalid. For example, the controller may decide whether or not the target logical group is invalid according to whether or not a bit value corresponding to the target logical group has been set to '1' in the upper-level bitmap stored in the working memory.

For a target logical group that is valid (e.g., not invalid) (No branch from operation S103), the controller may store a trim log including information on the target logical sectors in the log buffer included in the controller in operation S105. The trim log may include information indicating a logical address range of the target logical sectors, and the logical address range may be included in a logical address range of one logical group. However, a size of the logical address range that may be stored in the trim log is not limited thereto.

The trim logs stored in the log buffer may be stored in a non-volatile memory device periodically or under a certain condition. The trim logs stored in the non-volatile memory device may be used to restore the lower-level bitmap and the upper-level bitmap to the latest state in a process of restoring the storage device that is abnormally terminated.

On the other hand, for a target logical group that is invalid (YES branch from operation S103), the controller may skip storing a trim log in operation S104. When the controller skips storing the trim log, an amount of the trim logs that need to be stored in the non-volatile memory device may decrease, and thus, trim latency may decrease and a lifespan of the non-volatile memory device may be improved. In addition, when the upper-level bitmap and the lower-level bitmap are restored using the trim logs, a time required for the controller to refer to an unnecessary trim log may decrease. Thus, the controller may quickly restore the storage device.

In operation S106, the controller may update the lower-level bitmap stored in the working memory. For example, the controller may indicate that the target logical sectors have been invalidated by setting bits having a value of '0' among bits corresponding to the target logical sectors in the lower-level bitmap to a value of '1.'

In operation S107, the controller may update the upper-level bitmap if necessary. For example, when all of the bit values of logical sectors included in a certain logical group are set to '1' as a result of updating the lower-level bitmap by the controller, the controller may set a bit value corresponding to the logical group in the upper-level bitmap from 0' to '1.'

In operation S108, the controller may provide a trim command completion response to the host.

Figure 5A:
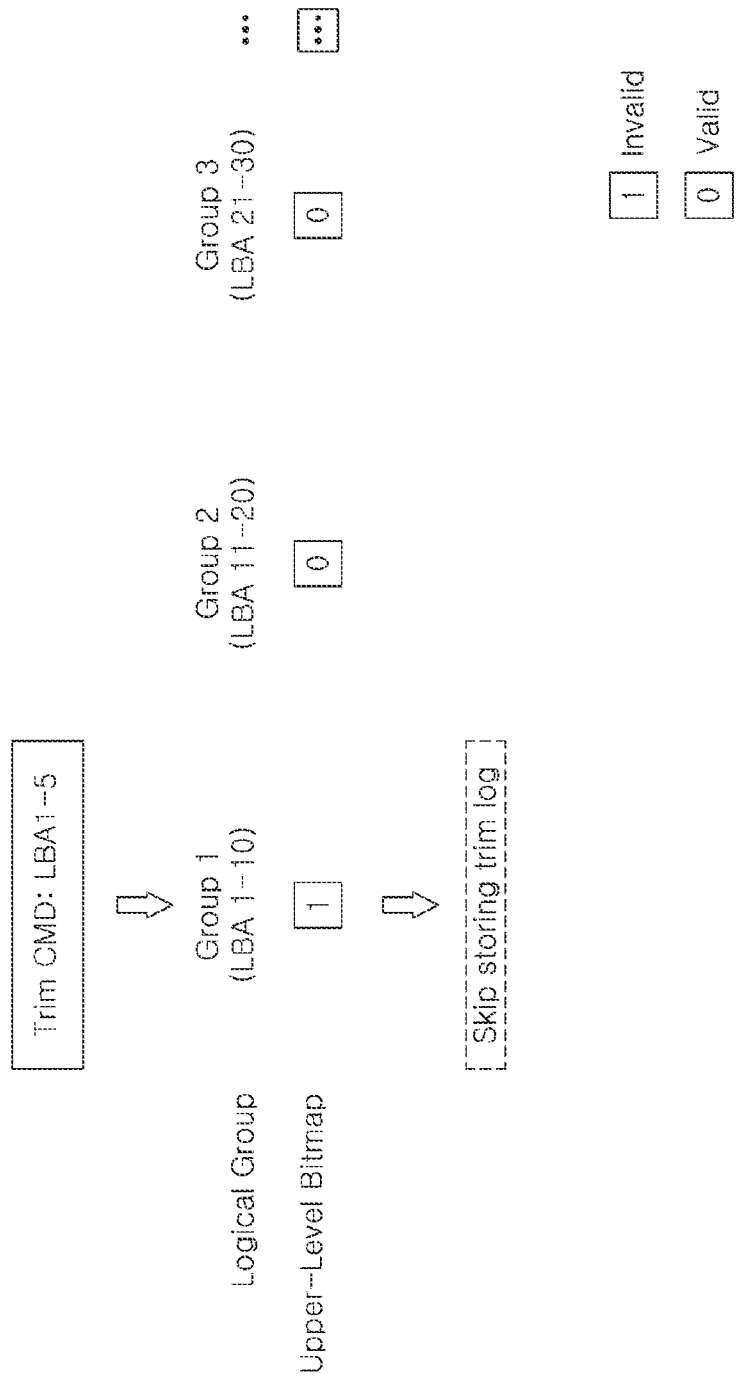
FIGS. 5A to 5C are diagrams illustrating aspects of trimming operations of the controller according to some example embodiments.
Figure 5B:
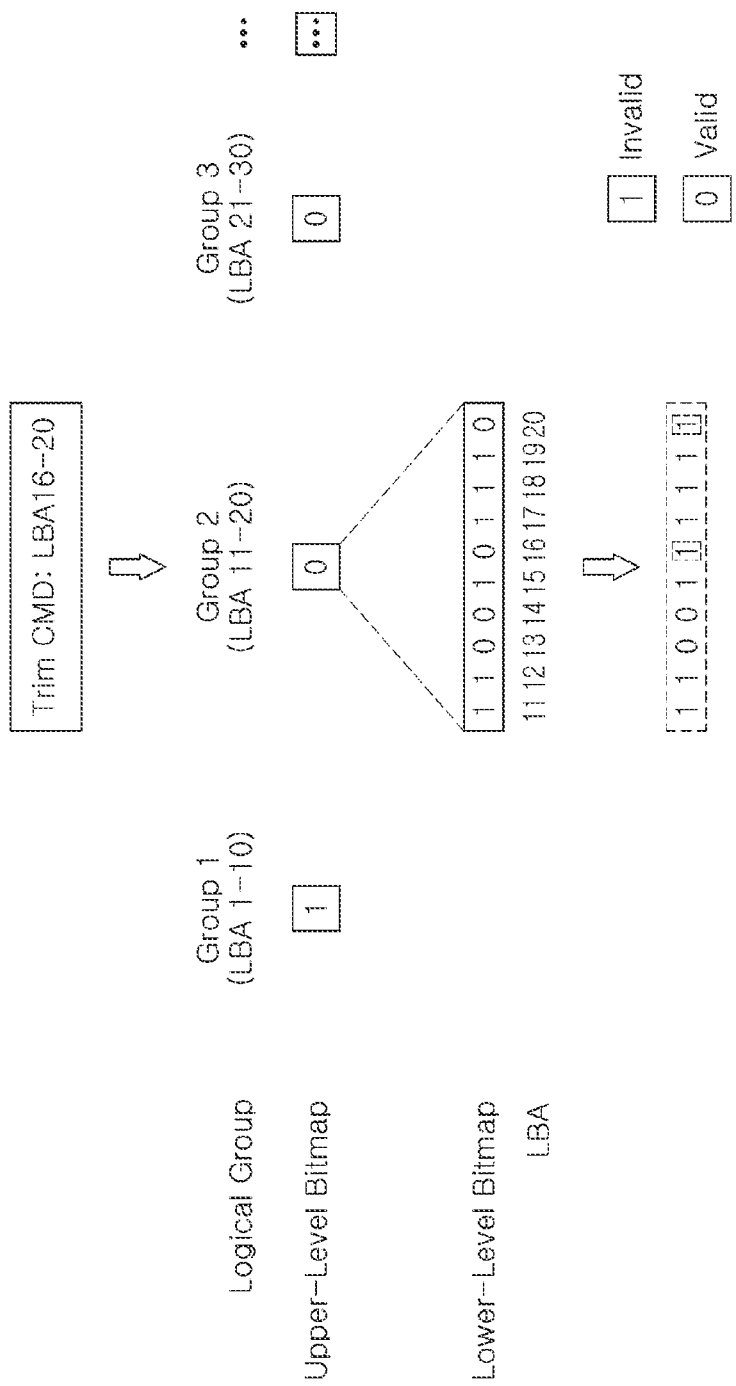
Figure 5C:
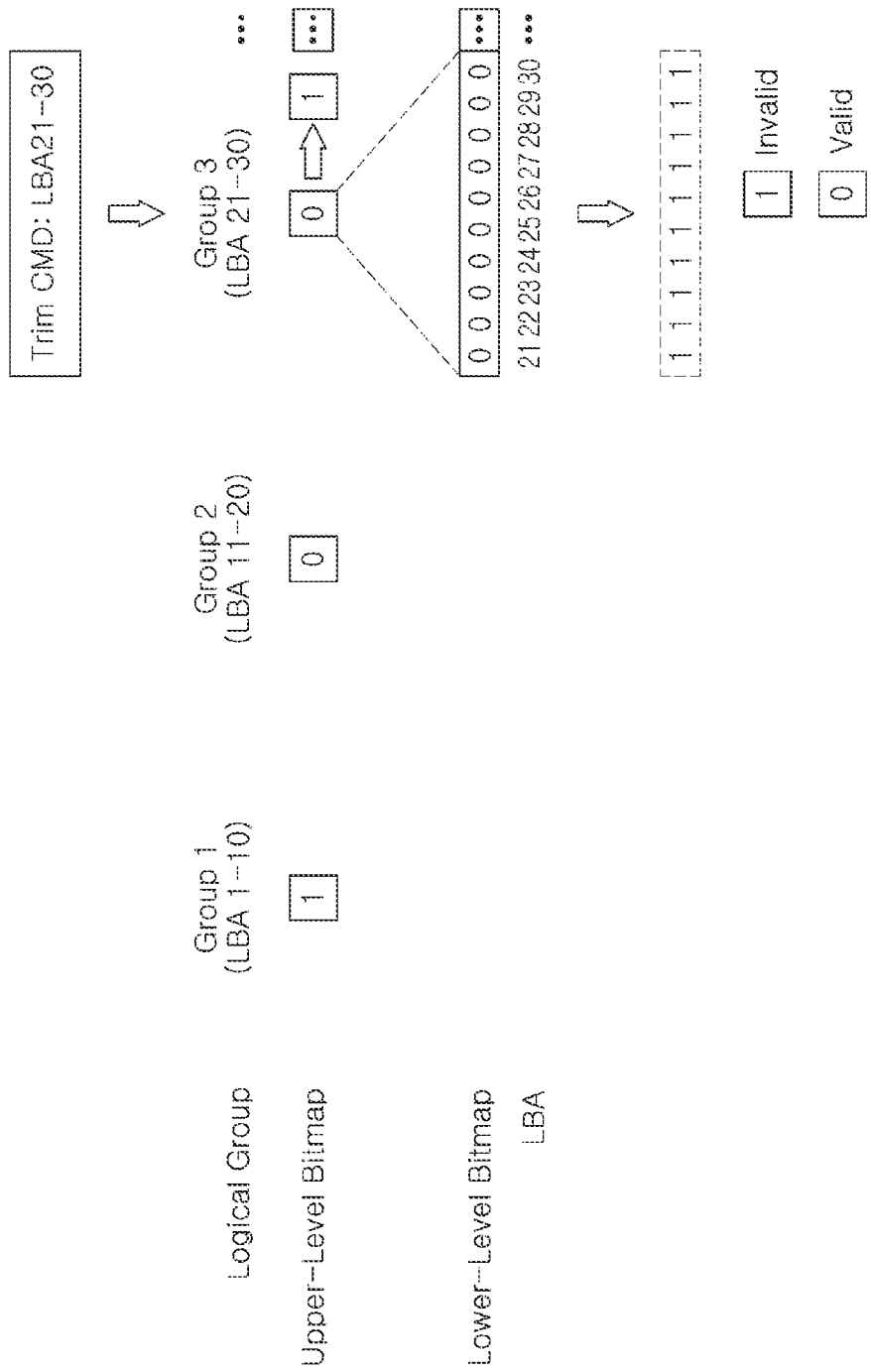

FIGS. 5A to 5C are diagrams illustrating aspects of trimming operations of the controller according to some example embodiments.

FIG. 5A is a diagram illustrating a trimming operation of the controller by taking a case where a trim command for target logical sectors included in a logical group that is invalid is received as an example.

For example, a trim command for target logical sectors having a logical address range of LBA1 to LBA5 may be received from the host.

The controller may refer to a bit value of the first logical group Group1, which is a target logical group including logical sectors of LBA1 to LBA5 in the upper-level bitmap, to decide whether or not the target logical group is invalid. In an example of FIG. 5A, the target logical group may be invalid, and all of the target logical sectors may be invalid. Accordingly, the controller may skip an operation of storing a trim log for the target logical sectors.

FIGS. 5B and 5C are diagrams illustrating trimming operations of the controller by taking a case where a trim command for target logical sectors included in a logical group that is not invalid is received as an example.

Referring to FIG. 5B, a trim command for target logical sectors having a logical address range of LBA16 to LBA20 may be received from the host.

The controller may refer to a bit value of the second logical group Group2, which is a target logical group including logical sectors of LBA16 to LBA20 in the upper-level bitmap, to decide whether or not the target logical group is invalid. In an example of FIG. 5B, the target logical group is not invalid, and thus, at least some of the target logical sectors may not be invalid. Accordingly, the controller may invalidate the target logical sectors by setting all of the bit values corresponding to the target logical sectors in the lower-level bitmap to '1.' In addition, the controller may store a trim log for the target logical sectors.

Referring to FIG. 5C, a trim command for target logical sectors having a logical address range of LBA21 to LBA30 may be received from the host.

The controller may refer to a bit value of the third logical group Group3, which is a target logical group including logical sectors of LBA21 to LBA30 in the upper-level bitmap, to decide whether or not the target logical group is invalid. In an example of FIG. 5C, the target logical group may not be invalid. The controller may invalidate the target logical sectors by setting all of the bit values corresponding to the target logical sectors in the lower-level bitmap to '1.' Meanwhile, as a result of invalidating the target logical sectors, all of the target logical sectors of the third group Group3 may be invalidated. The controller may set a bit value indicating whether or not the third logical group Group3 is invalid in the upper-level bitmap to '1.' In addition, the controller may store a trim log for the target logical sectors.

Meanwhile, the host may store data of a new file in the invalidated logical sectors. The host may provide information on a logical address range indicating logical sectors to which data are to be written, to the storage device, together with a write command and data to be written. The storage device may update the lower-level bitmap and the upper-level bitmap in order to indicate the invalidated logical sectors as valid sectors in response to the write command from the host.

Figure 6:
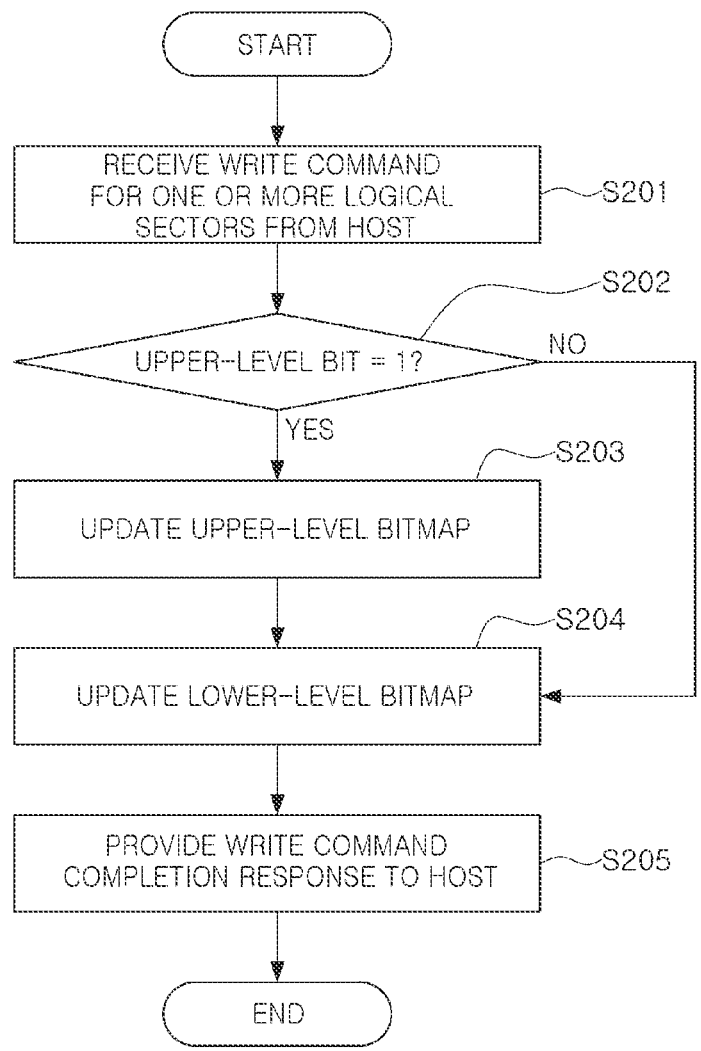
FIG. 6 is a flowchart illustrating aspects of write operations of the controller according to some example embodiments.

FIG. 6 is a flowchart illustrating aspects of write operations of the controller according to some example embodiments.

Referring to FIG. 6, in operation S201, the controller may receive a write command for one or more logical sectors from the host.

In operation S202, the controller may decide whether or not a logical group including the one or more logical sectors in the upper-level bitmap is invalid. For example, the controller may decide whether or not a bit value corresponding to the logical group is '1.'

When the logical group is invalid (Yes branch from operation S202), the controller may update the upper-level bitmap in operation S203, for example by clearing or setting the bit value corresponding to the logical group to '0'. This is because when data for the one or more logical sectors is written, the logical group is no longer invalid.

In operation S204, the controller may update the lower-level bitmap, for example by clearing or setting bits corresponding to the one or more logical sectors in the lower-level bitmap to '0.'

On the other hand, when the logical group is not invalid (No in S202), the controller may skip operation S203 and perform operation S204.

In operation S205, the controller may complete the write operation for the one or more logical sectors, and then provide a write command completion response to the host.

As described above, the storage device may be abnormally terminated due to sudden power interruption. The controller may store (e.g., periodically store) the lower-level bitmap, the upper-level bitmap, and the trim logs in the memory device so that the controller may restore the lower-level bitmap and the upper-level bitmap to the latest state even in cases or situations where the storage device is abnormally terminated. Aspects of methods in which the controller stores a trim log in the memory device and methods in which the controller restores bitmaps using the trim log will hereinafter be described in detail with reference to FIGS. 7 to 10.

Figure 7:
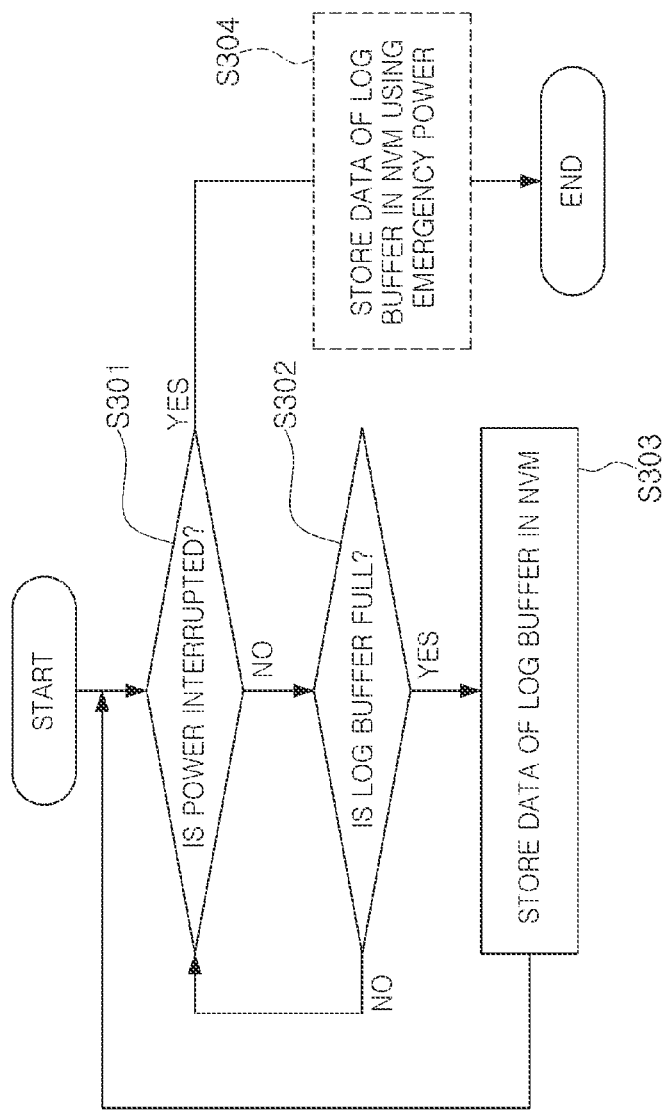
FIG. 7 is a flowchart illustrating aspects of trim log storage operations of the controller according to some example embodiments.

FIG. 7 is a flowchart illustrating aspects of trim log storage operations of the controller according to some example embodiments.

Referring to FIG. 7, in operation S301, the controller may detect whether or not the supply of power to the storage device has been interrupted.

When the supply of the power is not interrupted (No branch from operation S301), the controller may generate trim logs, if necessary, while performing a normal operation, and store the generated trim logs in the log buffer.

In operation S302, the controller may detect whether or not the log buffer is full of log data including the trim logs.

If the log buffer is not full (No branch from operation S302), the controller may return to S301.

On the other hand, if the log buffer is full (Yes branch from operation S302), the controller may store the log data stored in the log buffer in the non-volatile memory device in operation S303, and return to operation S301.

If and when the supply of the power is interrupted (Yes branch from operation S301), the normal operation of the controller may be stopped, and the storage device may be abnormally terminated.

According to some embodiments, and/or according to implementation, there may be some cases in which the storage device includes a hardware device for providing emergency power. In this case, the controller may store the data stored in the log buffer in the non-volatile memory device using the emergency power provided from the hardware device in operation S304, and terminate the storage device. In this case, even when the storage device is abnormally terminated, the latest trim logs may be preserved in the memory device.

Figure 8:
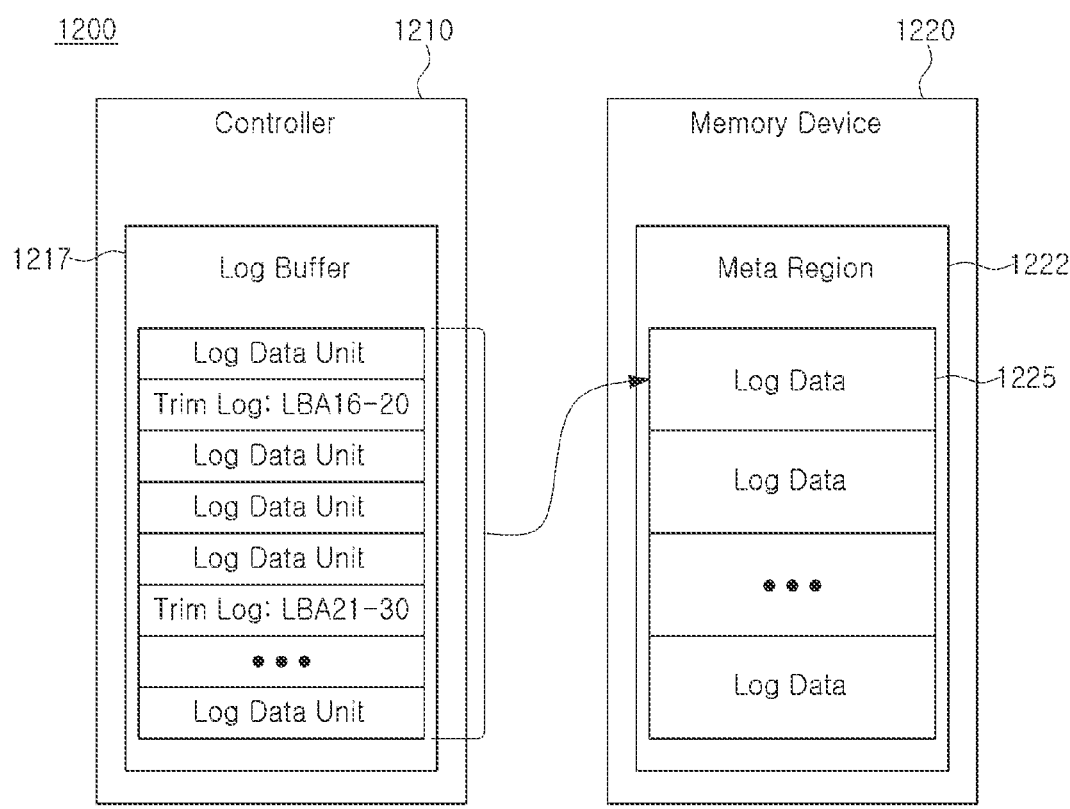
FIG. 8 is a diagram illustrating log data stored in a controller and a memory device in greater detail.

FIG. 8 is a diagram illustrating log data stored in a controller and a memory device in greater detail.

FIG. 8 illustrates a controller 1210 and a memory device 1220. The controller 1210 and the memory device 1220 may correspond, respectively, to the controller 1210 and the memory device 1220 described with reference to FIG. 2. As described with reference to FIG. 2, the controller 1210 may include a log buffer 1217 for storing log data. In addition, the memory device 1220 may include a meta region 1222 for storing metadata.

Even when the storage device is abnormally terminated, it is desirable that integrity of the storage device for a command of the host be maintained. In order to maintain the integrity, the storage device may store changes in the storage device according to the command of the host in the log buffer 1217 as log data.

FIG. 8 illustrates a plurality of unit log data stored in the log buffer 1217. Each of the unit log data may include changes according to the command of the host. Some of the unit log data may be trim logs. FIG. 8 illustrates log data that may be stored in the log buffer 1217 when the trim commands described with reference to FIGS. 5A to 5C are received. As may be seen in FIG. 8, and with reference to FIG. 5A, the storage of the trim logs for target logical sectors corresponding to LBA1 to LBA5, which are already invalidated logical sectors, may be skipped. On the other hand, with reference to FIGS. 5B and 5C, trim logs corresponding to LBA16 to LBA20 and LBA21 to LBA30 may be stored in the log buffer 1217.

The log data stored in the log buffer 1217 may be periodically stored in the meta region 1222. According to some embodiments, the log data stored in the log buffer 1217 may be transferred to the meta region 1222 even when the power of the storage device is interrupted. FIG. 8 illustrates a case where data stored in the log buffer 1217 are stored in the meta region 1222 as log data 1225. Since the memory device 1220 is a non-volatile memory device, the log data 1225 may be preserved even when the storage device is powered off. In order to restore the storage device after abnormal termination of the storage device, the controller may use the log data 1225.

Figure 9:
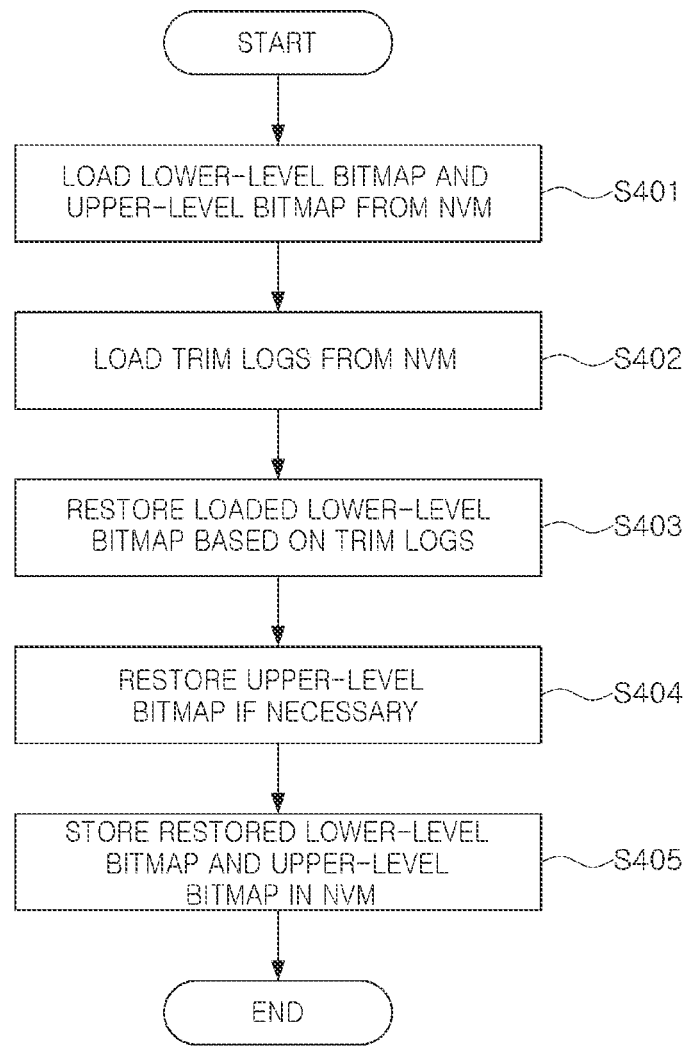
FIG. 9 is a flowchart illustrating aspects of operations in which the controller restores a lower-level bitmap and an upper-level bitmap according to some example embodiments.

FIG. 9 is a flowchart illustrating aspects of operations in which the controller restores a lower-level bitmap and an upper-level bitmap according to some example embodiments.

When power is supplied to the storage device, the controller may load the lower-level bitmap and the upper-level bitmap from the (non-volatile) memory device in operation S401. When the storage device has previously been abnormally terminated, the lower-level bitmap and the upper-level bitmap stored in the memory device may not be yet updated, and these bitmaps may not be in the latest state.

In operation S402, the controller may load the trim logs from the memory device. The trim logs may be stored together with other types of log data in the meta region of the memory device.

In operation S403, the controller may restore or update the loaded lower-level bitmap with reference to the trim logs. For example, the controller may set bit values corresponding to the target logical sectors in the lower-level bitmap to '1' by referring to the logical address range included in the trim logs.

In operation S404, the controller may restore or update the upper-level bitmap if necessary. For example, when all of the bits corresponding to a certain logical group are set to '1' as a result of updating the lower-level bitmap, the controller may set a bit corresponding to the certain logical group in the upper-level bitmap to '1.'

Through the operations S403 and S404, the controller may restore the lower-level bitmap and the upper-level bitmap.

For example, the controller may preserve the latest trim logs in the memory device using emergency power even when the storage device is abnormally terminated. In this case, the controller may restore the lower-level bitmap and the upper-level bitmap to the latest state using the trim logs stored in the memory device.

As another example, when the storage device does not include a hardware device for providing the emergency power, the latest trim logs may be lost when the storage device is abnormally terminated. In this case, the controller may restore the lower-level bitmap and the upper-level bitmap to a best effort state using the trim logs stored in the memory device. When information included in the lost trim logs is not reflected in the lower-level bitmap and the upper-level bitmap, some of data of an invalid file of the host may be stored as valid data in the storage device. When some of the data of the invalid file are stored as the valid data, an effective storage space of the storage device may slightly decease, but the storage device may operate normally.

In operation S405, the controller may store the restored lower-level bitmap and upper-level bitmap in the memory device.

Figure 10:
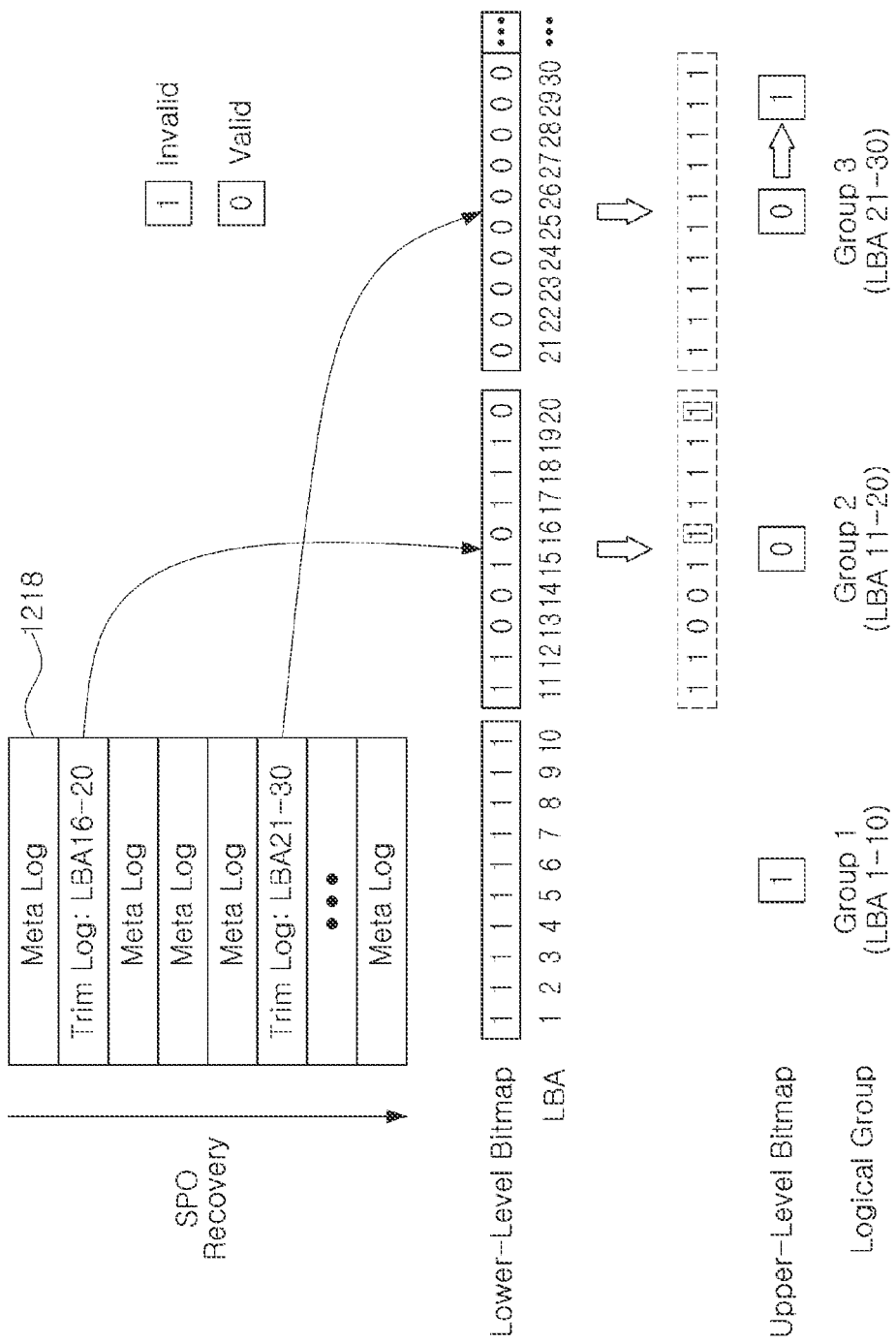
FIG. 10 is a diagram illustrating aspects of methods in which the controller restores a lower-level bitmap and an upper-level bitmap with reference to trim logs.

FIG. 10 is a diagram illustrating aspects of methods in which the controller restores a lower-level bitmap and an upper-level bitmap with reference to trim logs.

The controller may sequentially scan log data 1218 loaded from the memory device to restore the abnormally terminated storage device to a normal state. The log data 1218 illustrated in FIG. 10 are an example, and may be the same as the log data 1225 illustrated in FIG. 8.

A method of restoring the lower-level bitmap and the upper-level bitmap using each trim log may be similar to a method of updating the lower-level bitmap and the upper-level bitmap in response to a trim command.

For example, bit values corresponding to logical sectors having addresses of LBA16 to LBA20 in the lower-level bitmap may be set to '1' with reference to the trim log including the logical address range LBA16 to LBA20. In addition, bit values corresponding to logical sectors having addresses of LBA21 to LBA30 in the lower-level bitmap may be set to '1' with reference to the trim log including the logical address range LBA21 to LBA30. Since all of the bit values corresponding to the third logical group Group3 in the lower-level bitmap are set to '1', the bit value corresponding to the third logical group Group3 in the upper-level bitmap may be set to '1.'

In some situations and cases, the controller may perform a trimming operation on a logical region of a wide range spanning a plurality of logical groups. For example, the host may provide a sanitize command to the storage device so as to delete data in the entire user region of the storage device. When the controller performs the sanitize command, the controller may perform a trimming operation on the entire logical address region in order to invalidate the entire logical address region.

According to some example embodiments, when the controller performs the trimming operation on a logical region spanning a plurality of target logical groups, the controller may confirm whether or not each of the target logical groups of the plurality of target logical groups is invalid with reference to the upper-level bitmap. In addition, the controller may skip storing a trim log for the target logical group that is already invalid according to a result of confirming whether or not each of the target logical groups is invalid.

When the controller skips storing the trim log for the logical group that is already invalid, an amount of trim logs to be stored in the memory device while performing the trimming operation on the logical region may be decreased. Accordingly, a time required to store the trim logs may decrease, and trim latency may decrease. Some example embodiments will be described with reference to FIGS. 11 and 12 by taking a case where the controller performs a sanitize command as an example.

Figure 11:
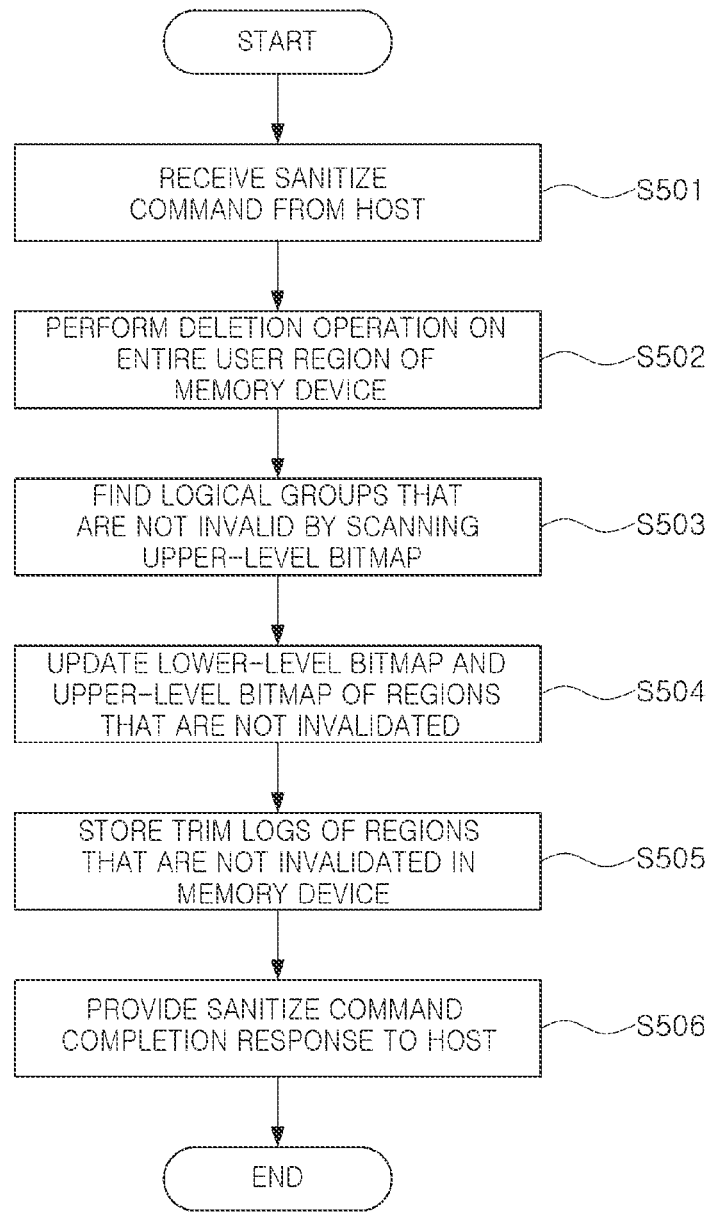
FIG. 11 is a flowchart illustrating aspects of operations in which the controller performs a sanitize command, according to some example embodiments.

FIG. 11 is a flowchart illustrating aspects of operations in which the controller performs a sanitize command, according to some example embodiments.

In operation S501, the controller may receive a sanitize command from the host. For example, the sanitize command may include a secure erase command, a crypto erase command, and/or the like.

In operation S502, the controller may perform a deletion operation on the entire user region of the memory device in response to the sanitize command. As an example, the controller may perform an erase operation on each of memory blocks allocated in order to store user data in the memory device in response to the secure erase command. As another example, the controller may change or delete an encryption key used when encrypting user data to be stored in the memory device in response to the crypto erase command to make the user data unrestorable.

In operations S503 and S504, the controller may invalidate the entire logical address region used in the host. Specifically, the controller may find logical groups that are not invalid by scanning the upper-level bitmap in operation S503. For example, the controller may find logical groups of which bit values are '0' in the upper-level bitmap.

In operation S504, the controller may invalidate logical sectors that are not invalidated by setting bit values of logical sectors included in logical groups that are not invalid in the lower-level bitmap to '1.' In addition, bit values of bits having the bit value '0' in the upper-level bitmap may be set to '1.'

In operation S505, the controller may generate trim logs of the logical groups that are not invalid and store the generated trim logs in the memory device. Meanwhile, the controller may skip generating and storing the trim logs for the logical groups that are invalid.

In operation S506, the controller may provide a completion response to the sanitize command to the host.

Figure 12:
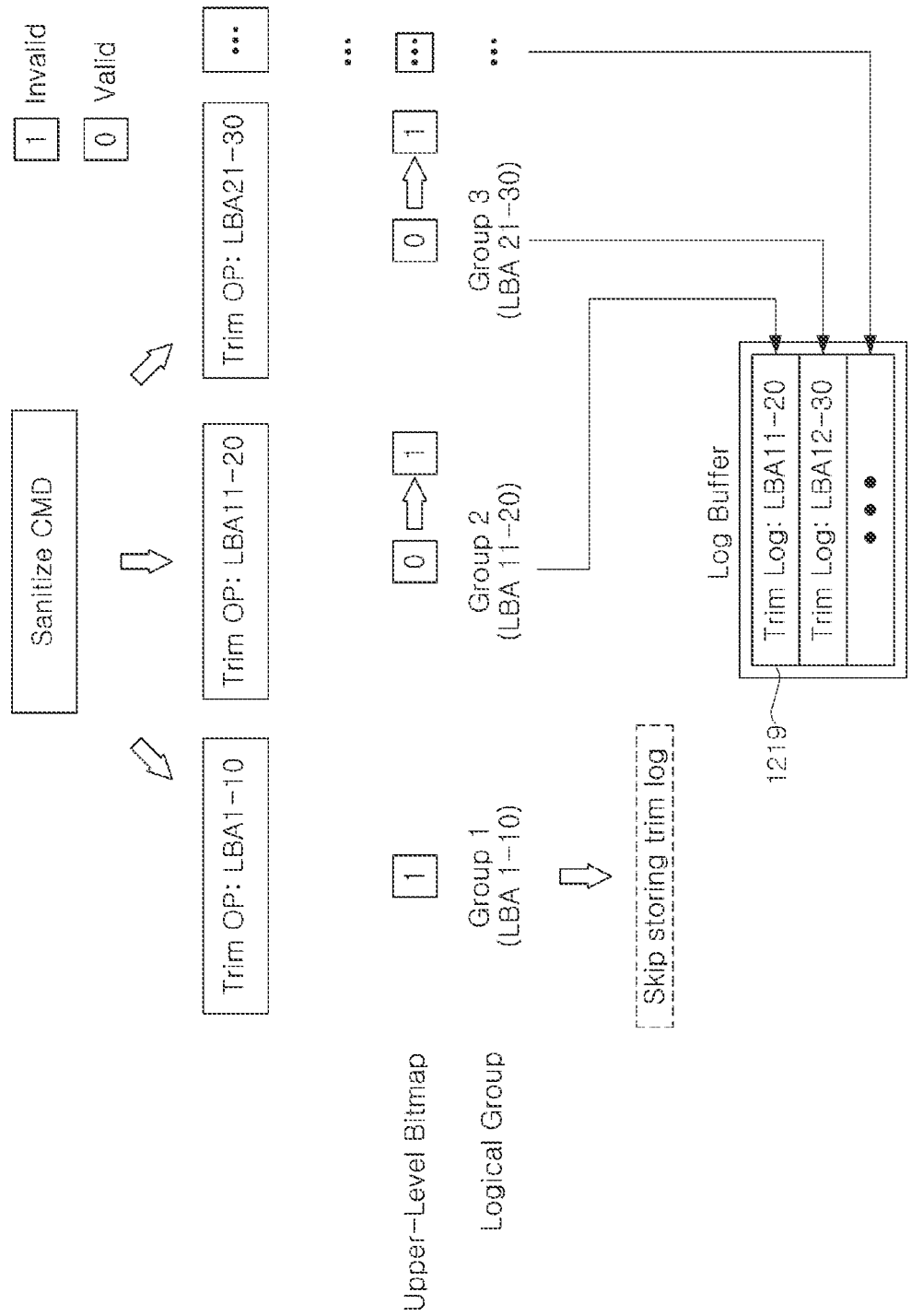
FIG. 12 is a diagram illustrating the method in which the controller performs the sanitize command according to some example embodiments.

FIG. 12 is a diagram illustrating aspects of methods in which the controller performs the sanitize command according to some example embodiments.

As described above, the sanitize command may be accompanied by a trimming operation for the entire logical address space used in the host. Referring to FIG. 12, the controller may divide a trimming operation for the entire logical address space into trimming operations for each logical group and perform the trimming operations for each logical group.

The controller may scan the upper-level bitmap to find logical groups that are not invalid, and set bits for logical sectors included in the logical groups in the lower-level bitmap. In addition, the controller may update the upper-level bitmap.

The controller may perform trimming operations for each logical group and store a trim log for a logical group that is not invalid, but may skip storing a trim log for a logical group that is invalid. FIG. 12 illustrates log data 1219 that may be stored in the controller. Data for the second and third logical groups Group2 and Group3 may be included in the log data 1219, but a trim log for the first logical group Group1 may be skipped.

Meanwhile, a range of logical address that may be included in one trim log may be limited. When restoring the storage device with reference to log data, if too many target logical sectors are included in the logical address range included in one trim log, it may take a long time to set bits of the lower-level bitmap. When it takes a long time to process one trim log, it may become difficult to restore the storage device within a predetermined limit time. Accordingly, when the number of target logical sectors to be trimmed is large, the target logical sectors may be divided into a plurality of logical address ranges, and a plurality of trim logs may be then generated and stored in the log buffer.

In an example of FIG. 12, the trim log may be generated in units of logical groups. However, the present disclosure is not limited thereto. Logical addresses included in the trim log may have two or more logical group ranges. For example, address ranges of the second and third logical groups Group2 and Group3 may be included in one trim log.

When only trim logs for logical groups that are not invalid are stored in the memory device, according to some example embodiments, a range of logical addresses that may be included in one trim log may be increased. On the other hand, when the controller generates only trim logs for logical groups that are not invalidated, a proportion of the trim logs among log data included in the log buffer may decrease. Accordingly, even in cases where the logical address range included in one trim log is increased, the storage device may be restored within a predetermined limit time.

According to some example embodiments, when the controller performs a trimming operation on the entire logical address region, the controller may generate trim logs for the logical groups that are not invalidated and store the generated trim logs in the memory device, instead of generating trim logs for all logical groups. Since an amount of log data stored in the memory device in order to perform the trimming operation may decrease, a time required to program the log data may decrease, and resultantly, trim latency may decrease.

Hereinafter, some examples of systems and aspects thereof to which the storage devices according to some example embodiments may be applied will be described with reference to FIGS. 13 to 17.

Figure 13:
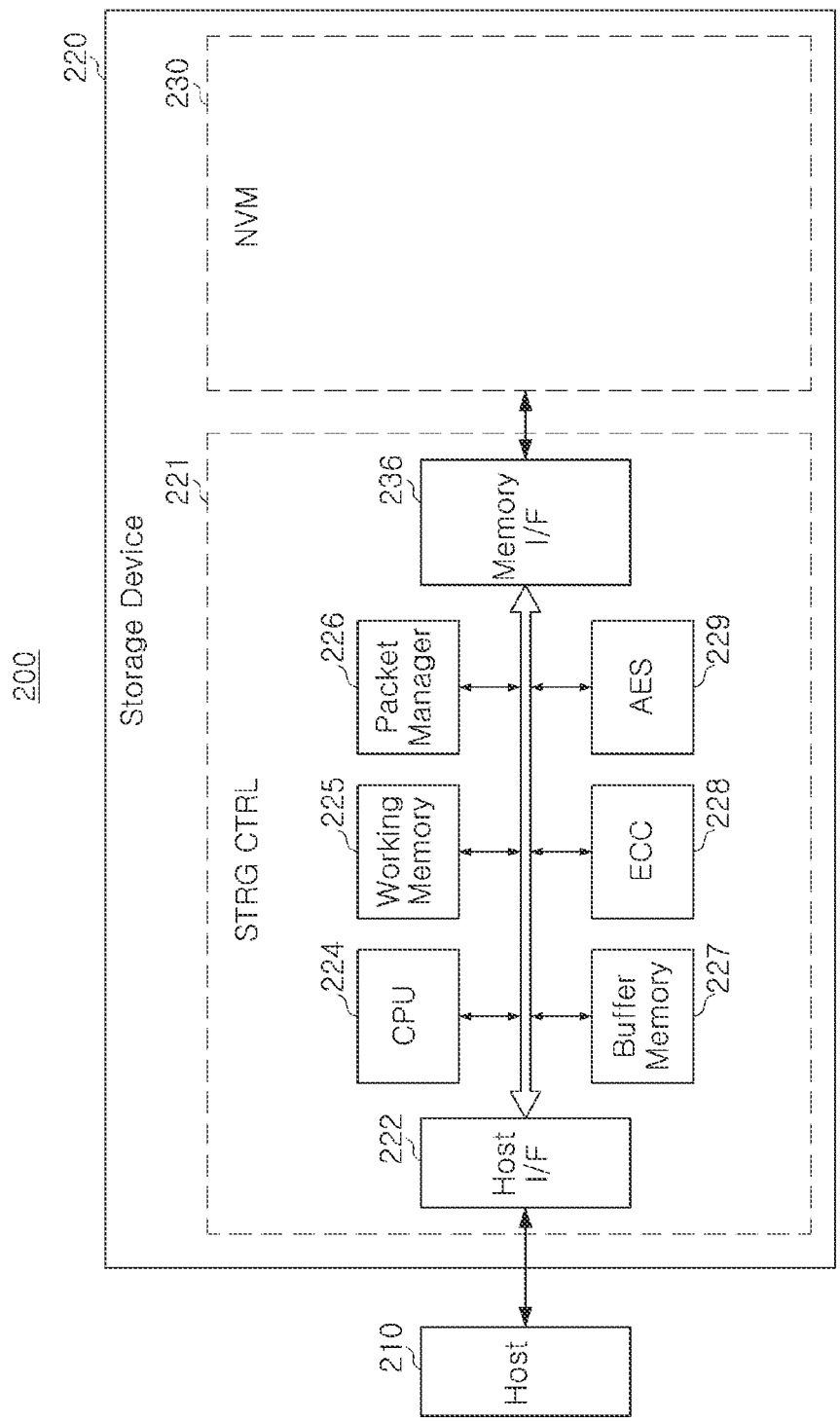
FIGS. 13 to 17 are diagrams illustrating aspects of systems to which the storage devices according to some example embodiments may be applied.

FIG. 13 is a block diagram illustrating a host-storage system according to some example embodiments.

A host-storage system 200 may include a host 210 and a storage device 200. In addition, the storage device 220 may include a storage controller 221 and a non-volatile memory (NVM) 230.

Non-limiting examples of the host 210 may include electronic devices, for example, mobile electronic devices such as mobile phones, MP3 players, and laptop computers, or electronic devices such as desktop computers, game machines, televisions (TVs), and/or projectors. The host 210 may include at least one operating system (OS). The operating system may generally manage and control functions and operations of the host 210.

The storage device 220 may include storage media for storing data according to a request from the host 210. As an example, the storage device 220 may include at least one of a solid state drive (SSD), an embedded memory, and a removable external memory. When the storage device 220 is the SSD, the storage device 220 may be a device conforming to a non-volatile memory express (NVMe) standard. When the storage device 220 is the embedded memory or the external memory, the storage device 220 may be a device conforming to a universal flash storage (UFS) or embedded multi-media card (eMMC) standard. Each of the host 210 and the storage device 220 may generate and transmit packets according to an adopted standard protocol.

The non-volatile memory 230 may retain stored data even in the case that power is not supplied thereto. The non-volatile memory 230 may store data provided from the host 210 through a program operation, and may output stored data through a read operation.

When the non-volatile memory 230 includes a flash memory, the flash memory may include a 2D NAND memory array or a 3D (or vertical) NAND (VNAND) memory array. As another example, the storage device 220 may include various other types of non-volatile memories. For example, the storage device 220 may include a magnetic random access memory (MRAM), a Spin-Transfer Torque MRAM, a conductive bridging RAM (CBRAM), a ferroelectric RAM (FeRAM), a phase RAM (PRAM), a resistive RAM, and/or various other types of memories.

The storage controller 221 may control the non-volatile memory 230 in response to a request from the host 210. For example, the storage controller 221 may provide data read from the non-volatile memory 230 to the host 210, and store the data provided from the host 210 in the non-volatile memory 230. For such an operation, the storage controller 221 may support operations such as a read operation, a program operation, and/or an erase operation of the non-volatile memory 230.

The storage controller 221 may include a host interface 222, a memory interface 223, and a central processing unit (CPU) 224. In addition, the storage controller 221 may further include a working memory 225, a packet manager 226, a buffer memory 227, an error correction code (ECC) engine 228, and/or an advanced encryption standard (AES) engine 229. An FTL (not illustrated) may be loaded into the working memory 225, and data storage and reading operations for the non-volatile memory 230 may be controlled by the CPU 224 executing the FTL.

The host interface 222 may transmit and receive packets to and from the host 210. The packet transmitted from the host 210 to the host interface 222 may include a command, data to be stored in the non-volatile memory 230, and/or the like, and the packet transmitted from the host interface 222 to the host 210 may include a response to the command, data read from the non-volatile memory 230, and/or the like.

The memory interface 223 may transmit data to be stored in the non-volatile memory 230 to the non-volatile memory 230 or may receive data read from the non-volatile memory 230. Such a memory interface 223 may be implemented to comply with a standard protocol such as a toggle or an Open NAND Flash Interface (ONFI).

The FTL may perform several functions such as address mapping, wear-leveling, and garbage collection. The address mapping is an operation of converting a logical address received from the host 210 into a physical address used to actually store data in the non-volatile memory 230. The wear-leveling is a technology for preventing excessive deterioration of a specific block by allowing blocks in the non-volatile memory 230 to be uniformly used, and may be implemented through, for example, a firmware technology of balancing erase counts of physical blocks. The garbage collection is a technology for securing a usable capacity in the non-volatile memory 230 in a manner of copying valid data of a block to a new block and then erasing an existing block.

The packet manager 226 may generate a packet according to a protocol of an interface negotiated with the host 210 or parse various information from a packet received from the host 210. In addition, the buffer memory 227 may temporarily store data to be stored in the non-volatile memory 230 or data to be read from the non-volatile memory 230. The buffer memory 227 may be provided in the storage controller 221, but may also be outside the storage controller 221.

The ECC engine 228 may perform an error detection and correction function for read data read from the non-volatile memory 230. More specifically, the ECC engine 228 may generate parity bits for write data to be written into the non-volatile memory 230, and the parity bits generated as described above may be stored in the non-volatile memory 230 together with the write data. At the time of reading data from the non-volatile memory 230, the ECC engine 228 may correct an error of read data using the parity bits read from the non-volatile memory 230 together with the read data, and output the read data of which the error is corrected.

The AES engine 229 may perform at least one of an encryption operation and a decryption operation for data input to the storage controller 221 using a symmetric-key algorithm.

Figure 14:
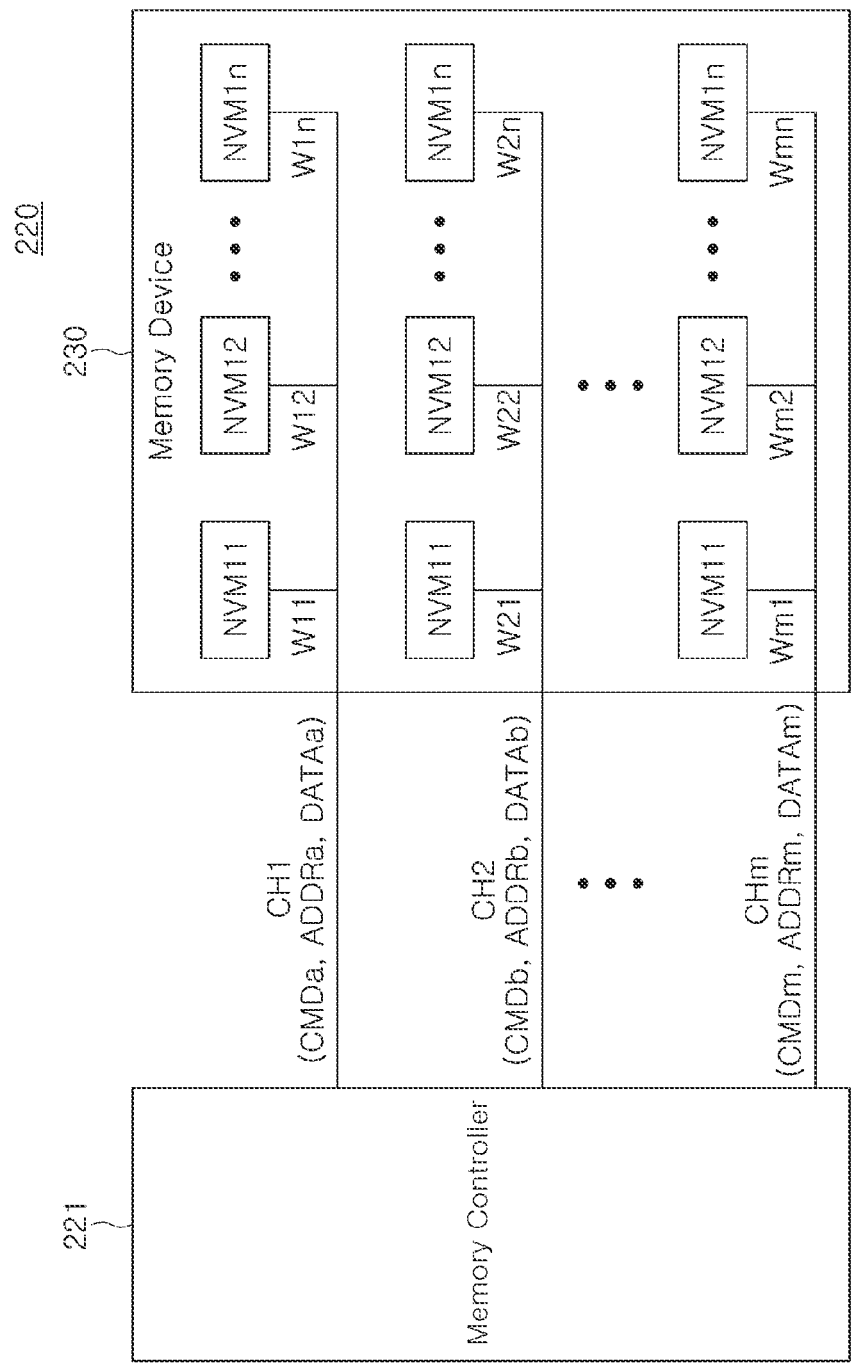

FIG. 14 is a block diagram illustrating a memory system according to some example embodiments. Referring to FIG. 14, a memory system 220 may include a memory device 230 and a memory controller 221. The memory system 220 may support a plurality of channels CH1 to CHm, and the memory device 230 and the memory controller 221 may be connected to each other through the plurality of channels CH1 to CHm. For example, the memory system 220 may be implemented as a storage device such as a solid state drive (SSD).

The memory device 230 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1n may be connected to a first channel CH1 through ways W11 to W1n, and the non-volatile memory devices NVM21 to NVM2n may be connected to a second channel CH2 through ways W21 to W2n. In some example embodiments, each of the non-volatile memory devices NVM11 to NVMmn may be implemented in an arbitrary memory unit capable of operating according to an individual command from the memory controller 221. For example, each of the non-volatile memory devices NVM11 to NVMmn may be implemented as a chip or die, but the present disclosure is not limited thereto.

The memory controller 221 may transmit and receive signals to and from the memory device 230 through the plurality of channels CH1 to CHm. For example, the memory controller 221 may transmit commands CMDa to CMDm, addresses ADDRa to ADDRm, and data DATAa to DATAm to the memory device 230 or receive data DATAa to DATAm from the memory device 230, through the channels CH1 to CHm.

The memory controller 221 may select one of the non-volatile memory devices NVM11 to NVMmn connected to a corresponding channel through each channel, and transmit and receive signals to and from the selected non-volatile memory device. For example, the memory controller 221 may select the non-volatile memory device NVM11 of the non-volatile memory devices NVM11 to NVM1n connected to the first channel CH1. The memory controller 221 may transmit a command CMDa, an address ADDRa, and data DATAa to the selected non-volatile memory device NVM11 and/or receive data DATAa from the selected non-volatile memory device NVM11, through the first channel CH1.

The memory controller 221 may transmit and receive signals to and from the memory device 230 in parallel through different channels. For example, the memory controller 221 may transmit a command CMDb to the memory device 230 through the second channel CH2 while transmitting the command CMDa to the memory device 230 through the first channel CH1. For example, the memory controller 221 may receive data DATAb from the memory device 230 through the second channel CH2 while receiving the data DATAa from the memory device 230 through the first channel CH1.

The memory controller 221 may generate a plurality of internal commands such as the command CMDa and the command CMDb in order to control a parallel operation of the memory device 230 and provide the plurality of internal commands to the non-volatile memory devices NVM11 to NVMmn. Each of the internal commands may include address information or the like of a non-volatile memory device on which the internal command is to be performed. The memory controller 221 may include a command pool including storage spaces for queuing the internal commands. The number of commands that may be queued in the command pool may be limited.

When the memory controller 221 programs log data, the memory controller 221 may control the log data to be programmed in the plurality of non-volatile memory devices NVM11 to NVMmn in parallel. That is, the memory controller 221 may generate a plurality of internal commands in order to program the log data, which may be allocated across a plurality of storage spaces from the command pool. Since the number of storage spaces capable of queuing internal commands in the command pool is limited, the memory controller 221 may need to continuously poll the command pool until the plurality of storage spaces are provided.

According to some example embodiments, the memory controller 221 may confirm an upper-level bitmap indicating whether or not a logical group is invalid at the time of performing a trimming operation, and may skip storing a trim log when the logical group is invalid. When an amount of generated trim logs decreases, a cycle at which the memory controller 221 programs the log data may be lengthened. Accordingly, overhead for the memory controller 221 to be allocated a command pool in order to program the log data may decrease, and performance of the memory controller 221 may be improved.

The memory controller 221 may control a general operation of the memory device 230. The memory controller 221 may control each of the non-volatile memory devices NVM11 to NVMmn connected to the channels CH1 to CHm by transmitting signals to the channels CH1 to CHm. For example, the memory controller 221 may control one non-volatile memory device selected among the non-volatile memory devices NVM11 to NVM1n by transmitting the command CMDa and the address ADDRa to the first channel CH1.

Each of the non-volatile memory devices NVM11 to NVMmn may operate under the control of the memory controller 221. For example, the non-volatile memory device NVM11 may program the data DATAa according to the command CMDa and the address ADDRa provided to the first channel CH1. For example, the non-volatile memory device NVM21 may read the data DATAb according to the command CMDb and the address ADDRb provided to the second channel CH2, and transmit the read data DATAb to the memory controller 221.

It is illustrated in FIG. 14 that the memory device 230 communicates with the memory controller 221 through m channels and the memory device 230 includes n non-volatile memory devices corresponding to each channel, but the number of channels and the number of non-volatile memory devices connected to one channel may be variously modified.

Figure 15:
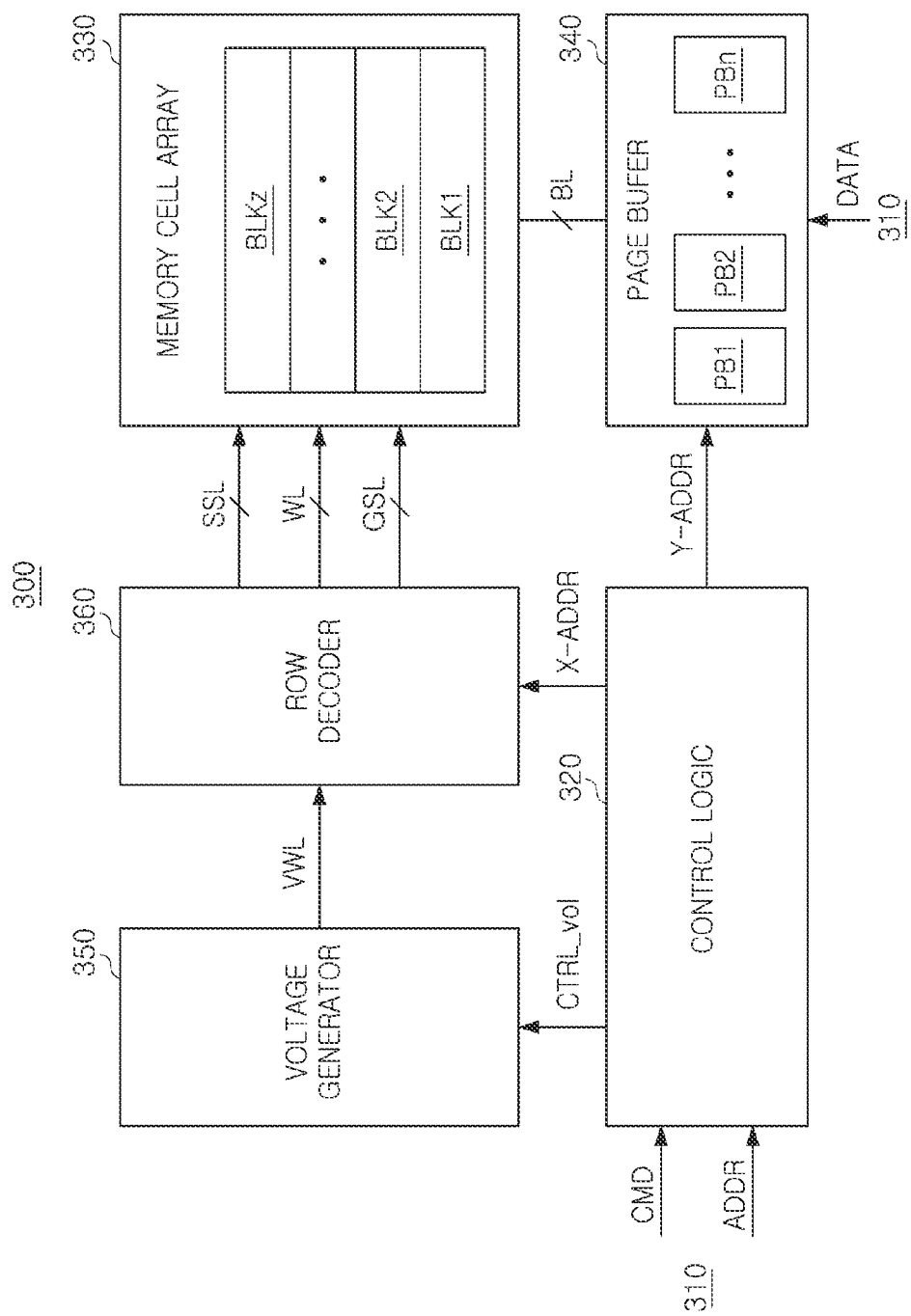

FIG. 15 is an illustrative block diagram illustrating a memory device. Referring to FIG. 15, a memory device 300 may include a control logic circuit 320, a memory cell array 330, a page buffer 340, a voltage generator 350, and a row decoder 360. Although not illustrated in FIG. 15, the memory device 300 may further include a memory interface circuit 310, and may further include a column logic, a pre-decoder, a temperature sensor, a command decoder, an address decoder, and/or the like.

The control logic circuit 320 may generally control various operations within the memory device 300. The control logic circuit 320 may output various control signals in response to a command CMD and/or an address ADDR from the memory interface circuit 310. For example, the control logic circuit 320 may output a voltage control signal CTRL vol, a row address X-ADDR, and a column address Y-ADDR.

The memory cell array 330 may include a plurality of memory blocks BLK1 to BLKz (z is a positive integer), each of which may include a plurality of memory cells. The memory cell array 330 may be connected to the page buffer unit 340 through bit lines BL, and may be connected to the row decoder 360 through word lines WL, string selection lines SSL, and ground selection lines GSL.

In some example embodiments, the memory cell array 330 may include a three-dimensional (3D) memory cell array, and the 3D memory cell array may include a plurality of NAND strings. Each NAND string may include memory cells each connected to word lines vertically stacked on a substrate. U.S. Pat. Nos. 7,679,133, 8,553,466, 8,654,587, 8,559,235, and U.S. Patent Application Publication No. 2011/0233648 describe aspects of such 3D memory cell arrays and/or NAND strings, and are herein incorporated by reference. In some example embodiments, the memory cell array 330 may include a two-dimensional (2D) memory cell array, and the 2D memory cell array may include a plurality of NAND strings arranged along row and column directions.

The page buffer 340 may include a plurality of page buffers PB1 to PBn (where n is an integer of 3 or more), and the plurality of page buffers PB1 to PBn may be connected to the memory cells through a plurality of bit lines BL, respectively. The page buffer 340 may select at least one of the bit lines BL in response to the column address Y-ADDR. The page buffer 340 may operate as a write driver or a sense amplifier according to an operation mode. For example, at the time of a program operation, the page buffer 340 may apply a bit line voltage corresponding to data to be programmed to the selected bit line. At the time of a read operation, the page buffer 340 may detect a current or a voltage of the selected bit line to detect data stored in the memory cell.

The voltage generator 350 may generate various types of voltages for performing program, read, and erase operations based on the voltage control signal CTRL vol. For example, the voltage generator 350 may generate a program voltage, a read voltage, a program verification voltage, an erase voltage, and the like, as word line voltages VWL.

The row decoder 360 may select one of a plurality of word lines WL and may select one of a plurality of string selection lines SSL, in response to the row address X-ADDR. For example, the row decoder 360 may apply the program voltage and the program verification voltage to the selected word line at the time of the program operation, and may apply the read voltage to the selected word line at the time of the read operation.

Figure 16:
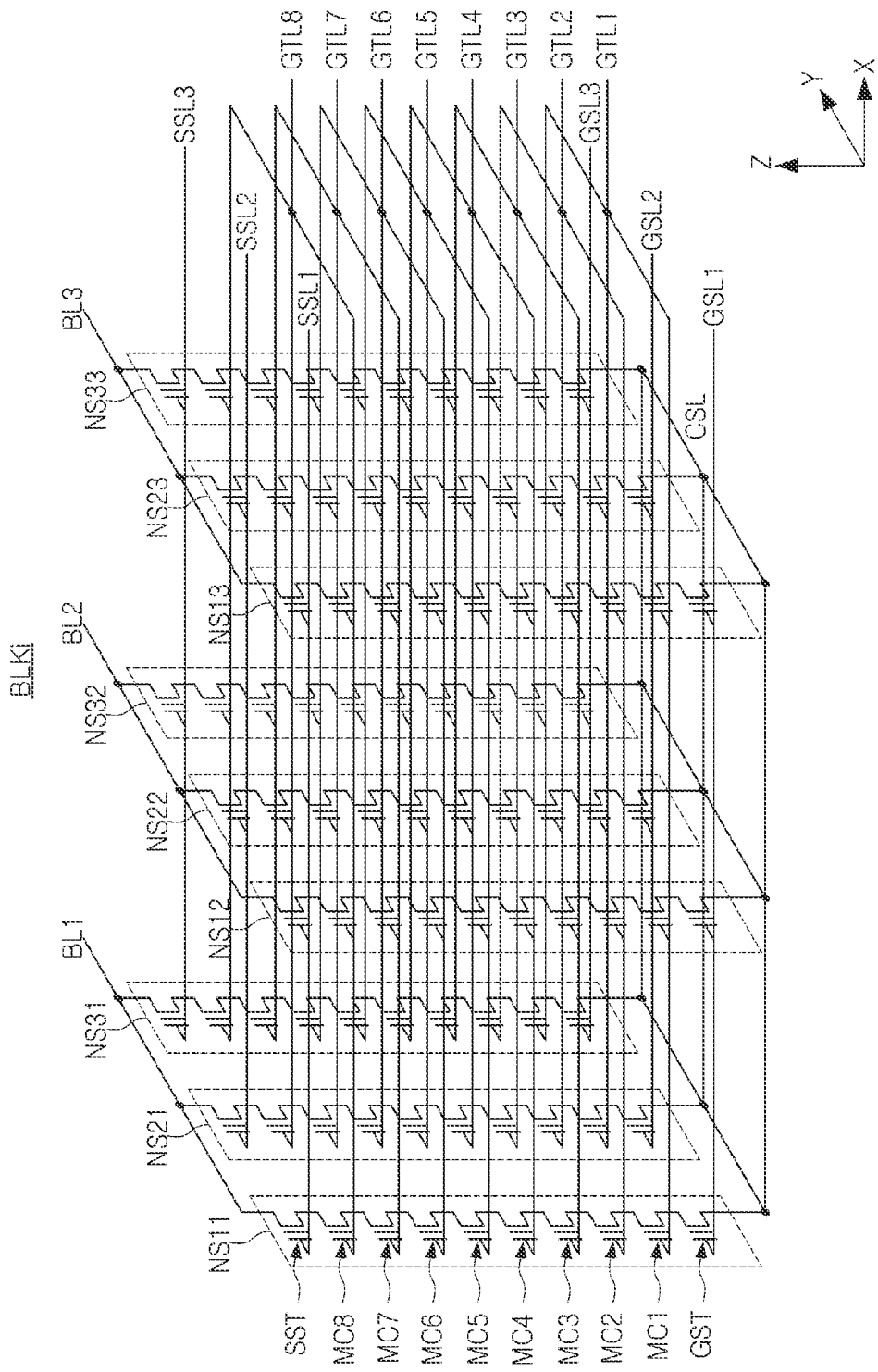

FIG. 16 is a diagram illustrating a 3D V-NAND structure that may be applied to a UFS device according to some example embodiments. When a storage module of the UFS device is implemented as a 3D V-NAND-type flash memory, each of a plurality of memory blocks constituting the storage module may be represented by an equivalent circuit as illustrated in FIG. 16.

A memory block BLKi illustrated in FIG. 16 is a three-dimensional memory block formed in a three-dimensional structure on a substrate. For example, a plurality of memory NAND strings included in the memory block BLKi may be formed in a direction perpendicular to the substrate.

Referring to FIG. 16, the memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. It has been illustrated in FIG. 16 that each of the plurality of memory NAND strings NS11 to NS33 includes eight memory cells MC1, MC2, . . . , MC8, but the present disclosure is not necessarily limited thereto.

The string selection transistors SST may be connected to corresponding string selection lines SSL1, SSL2, and SSL3. The plurality of memory cells MC1, MC2, . . . , MC8 may be connected to corresponding gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines. The ground selection transistors GST may be connected to corresponding ground selection lines GSL1, GSL2, and GSL3. The string selection transistors SST may be connected to corresponding bit lines BL1, BL2, and BL3, and the ground selection transistors GST may be connected to the common source line CSL.

Word lines (for example, WL1) having the same height may be connected in common, and the ground selection lines GSL1, GSL2, and GSL3 and the string selection lines SSL1, SSL2, and SSL3 may be separated from each other, respectively. It has been illustrated in FIG. 16 that the memory block BLKi is connected to eight gate lines GTL1, GTL2, . . . , GTL8 and three bit lines BL1, BL2, and BL3, but the present disclosure is not necessarily limited thereto.

Figure 17:
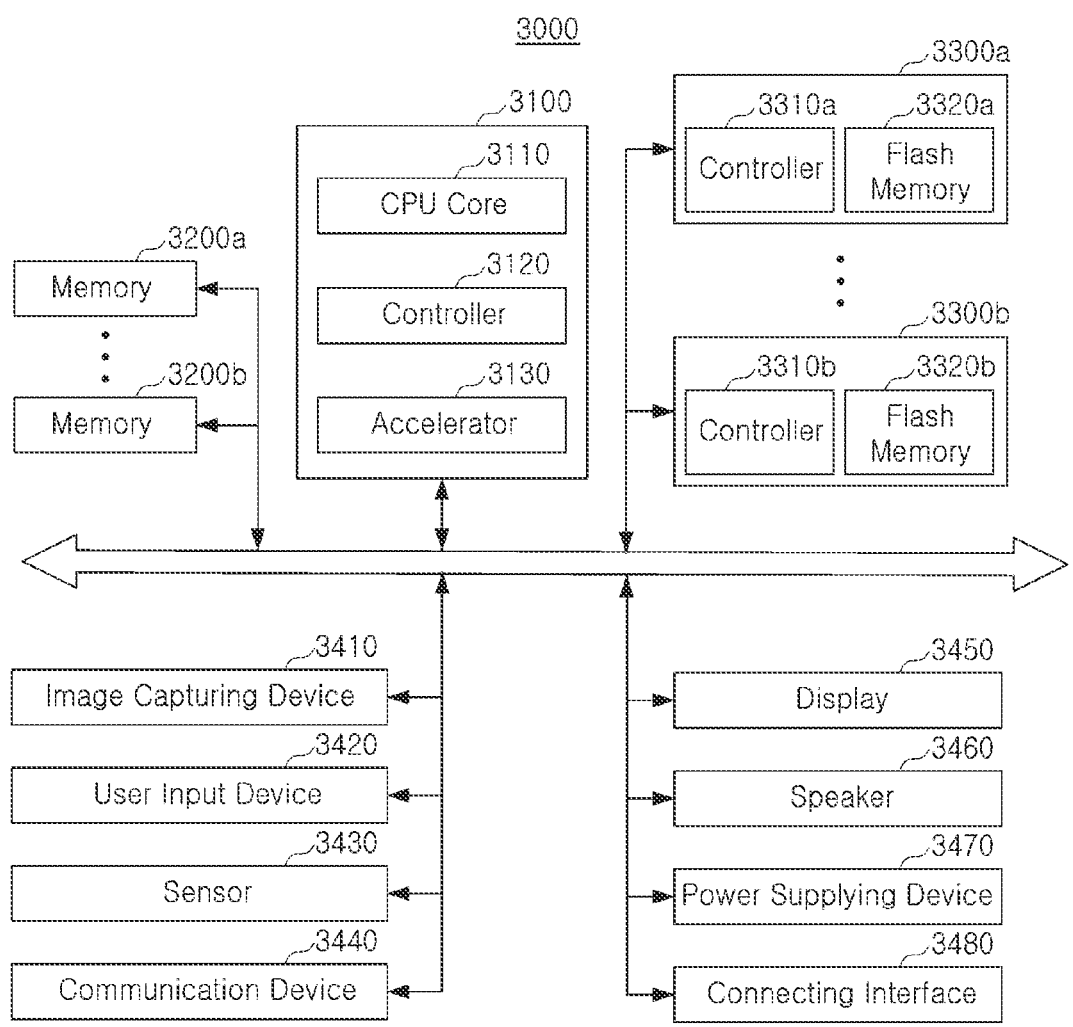

FIG. 17 is a block diagram illustrating a system 3000 to which storage devices according to some example embodiments may be applied. The system 3000 of FIG. 17 may be basically a mobile system such as a mobile phone, a smartphone, a tablet personal computer (PC), a wearable device, a healthcare device, or an Internet of things (JOT) device, as non-limiting examples of such mobile systems. However, the system 3000 of FIG. 17 is not necessarily limited to mobile systems, and may be a personal computer, a laptop computer, a server, a media player, an automotive device such as a navigation device, and/or the like (e.g., one of a broad classification of computing devices).

Referring to FIG. 17, the system 3000 may include a main processor 3100, memories 3200a and 3200b, and storage devices 3300a and 3300b, and may further include one or more of an image capturing device 3410, a user input device 3420, a sensor 3430, a communication device 3440, a display 3450, a speaker 3460, a power supplying device 3470, and a connecting interface 3480.

The main processor 3100 may control a general operation of the system 3000, and more specifically, may control operations of the other components constituting the system 3000. The main processor 3100 may be implemented as a general-purpose processor, a dedicated processor, an application processor, or the like.

The main processor 3100 may include one or more CPU cores 3110, and may further include a controller 3120 for controlling the memories 3200a and 3200b and/or the storage devices 3300a and 3300b. According to some example embodiments, the main processor 3100 may further include an accelerator 3130, which may be a dedicated circuit for high-speed data operation such as artificial intelligence (AI) data operation. Such an accelerator 3130 may include a graphics processing unit (GPU), a neural processing unit (NPU), a data processing unit (DPU), and/or the like, and may also be implemented as a separate chip physically independent from the other components of the main processor 3100.

The memories 3200a and 3200b may be used as main memory units of the system 3000, and may include volatile memories such as a static random access memory (SRAM) and/or a dynamic random access memory (DRAM), but may also include non-volatile memories such as a flash memory, a phase change random access memory (PRAM), and/or a resistive random access memory (RRAM). The memories 3200a and 3200b may also be implemented in the same package as the main processor 3100.

The storage devices 3300a and 3300b may function as non-volatile storage devices that store data regardless of whether or not power is supplied thereto, and may have a relatively greater storage capacity than the memories 3200a and 3200b. The storage devices 3300a and 3300b may include storage controllers 3310a and 3310b and non-volatile memories (NVMs) 3330a and 3320b that store data under the control of the storage controllers 3310a and 3310b, respectively. The non-volatile memories 3320a and 3320b may include flash memories having a 2-dimensional (2D) structure or a 3-dimensional (3D) vertical negative AND (V-NAND) structure, but may also include other types of non-volatile memories such as PRAMs and/or RRAMs.

The storage devices 3300a and 3300b may be included in the system 3000 in a state in which they are physically separated or separable from the main processor 3100 or may be implemented in the same package as the main processor 3100. In addition, the storage devices 3300a and 3300b may have a form such as a solid state device (SSD) or a memory card to be coupled detachably to the other components of the system 3000 through an interface such as a connecting interface 3480 to be described later. Such storage devices 3300a and 3300b may be devices to which a standard protocol, such as universal flash storage (UFS), embedded multi-media card (eMMC), or non-volatile memory express (NVMe), is applied, but the present disclosure is not necessarily limited thereto.

According to some example embodiments, the storage devices 3300a and 3300b may support a trimming operation according to a request of the main processor 3100. The storage devices 3300a and 3300b may layer a logical address space used in the main processor 3100, and manage whether the logical address space is invalid using a lower-level bitmap and an upper-level bitmap.

According to some example embodiments, the storage devices 3300a and 3300b may skip storing a trim log when it is decided that target logical sectors are already invalid with reference to an upper-level bitmap including the target logical sectors at the time of performing a trimming operation on the target logical sectors. An amount of log data that are to be preserved in the storage devices 3300a and 3300b may decrease. Accordingly, trim latency of the storage devices 3300a and 3300b may be shortened, performance of the storage devices 3300a and 3300b may be improved, and a lifespan of the internal non-volatile memory device may be improved.

The image capturing device 3410 may capture a still image or a moving image, and may be a camera, a camcorder, a webcam, or the like.

The user input device 3420 may receive various types of data input from a user of the system 3000, and may be a touch pad, a keypad, a keyboard, a mouse, a microphone, or the like.

The sensor 3430 may sense various types of physical quantities that may be obtained from the outside of the system 3000 and convert the sensed physical quantities into electrical signals. Such a sensor 3430 may be a temperature sensor, a pressure sensor, an illuminance sensor, a position sensor, an acceleration sensor, a biosensor, a gyroscope sensor, or the like.

The communication device 3440 may transmit and receive signals to and from other devices outside the system 3000 according to various communication protocols. Such a communication device 3440 may be implemented to include an antenna, a transceiver, a modem, and the like.

The display 3450 and the speaker 3460 may function as output devices that output visual information and auditory information to the user of the system 3000, respectively.

The power supplying device 3470 may appropriately convert power supplied from a battery (not illustrated) embedded in the system 3000 and/or an external power source and supply the converted power to respective components of the system 3000.

The connecting interface 3480 may provide a connection between the system 3000 and an external device connected to the system 3000 to be capable of transmitting and receiving data to and from the system 3000. The connecting interface 3480 may be implemented in various interface manners, with non-limiting examples including an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an Institute of Electrical and Electronic engineers (IEEE) 1394 standard, a universal serial bus (USB), a secure digital (SD) card, a multi-media card (MMC), an embedded multi-media card (eMMC), a universal flash storage (UFS), an embedded UFS (eUFS), and a compact flash (CF) card interface.

According to some example embodiments, a storage device capable of decreasing latency of a trimming operation by selectively performing an update of an invalid sector bitmap with reference to an invalid region bitmap indicating whether or not each logical region including a plurality of logical sectors has been invalidated in response to a trim command may be provided.

According to some example embodiments, a storage device capable of decreasing an amount of metadata to be programmed in a memory device and alleviating a decrease in lifespan of a memory device and a decrease in input/output performance of the storage device by selectively storing a trim log including information on a trim command with reference to an invalid region bitmap in response to the trim command may be provided.

The present inventive concepts are not limited by the example embodiments described above and the accompanying drawings. Therefore, various types of substitutions, modifications, and alterations may be made by those skilled in the art without departing from the scope of the present inventive concepts, as defined by the appended claims, and these substitutions, modifications, and alterations fall within the scope of the present inventive concepts.

What is claimed is:

1. A storage device comprising:
    a memory device configured to store a lower-level bitmap that indicates whether or not logical sectors are invalid in a host, and configured to store an upper-level bitmap that indicates whether or not logical groups are invalid, each logical group including a plurality of consecutive logical sectors; and
    a controller configured to control the memory device and comprising a log buffer,
    wherein the controller is configured to:
        retrieve the lower-level bitmap and the upper-level bitmap from the memory device;
        receive a trim command for one or more target logical sectors from the host and determine, based on the upper-level bitmap, whether or not one or more target logical groups that include the target logical sectors are invalid,
        store, in the log buffer, a trim log including address information of target logical sectors included in a target logical group that is determined to be not invalid and refrain from storing in the log buffer a trim log for target logical sectors included in a target logical group that is determined to be invalid,
        invalidate the target logical sectors and provide to the host a response to the trim command; and
        store trim logs stored in the log buffer in the memory device.

2. The storage device of claim 1, wherein the controller is configured to set a bit corresponding to one of the logical groups in the upper-level bit map when every one of the logical sectors included in the one logical group is invalid, and is configured to clear the bit when any one of the logical sectors included in the one logical group is valid.

3. The storage device of claim 1, wherein when every one of the constituent logical sectors included in one of the logical groups are invalid, the one logical group is determined by the controller to be invalid.

4. The storage device of claim 1, wherein the controller is configured to invalidate the target logical sectors by setting bits corresponding to the target logical sectors in the lower-level bitmap.

5. The storage device of claim 4, wherein the controller is configured to, as part of invalidating the target logical sectors, set a bit corresponding to a first logical group in the upper-level bitmap when every one of the logical sectors included in the first logical group are invalidated.

6. The storage device of claim 5, wherein the controller is configured to store the trim logs in the memory device in response to the log buffer being full.

7. The storage device of claim 5, wherein the controller is configured to store the trim logs in the memory device in response to a supply of power to the storage device being interrupted.

8. The storage device of claim 7, wherein the controller is configured to retrieve the lower-level bitmap, the upper-level bitmap, and the trim logs from the memory device, update the lower-level bitmap to a latest state using address information of the target logical sectors included in the trim logs, and update the upper-level bitmap to a latest state based on the lower-level bitmap, responsive to the supply of the power to the storage device being resumed after the supply of the power is interrupted.

9. The storage device of claim 1, wherein the trim log includes information indicating a logical address range of the target logical sectors, and the logical address range is included in a logical address range of one target logical group.

10. The storage device of claim 1, wherein the controller is configured to receive a write command and write data for one or more logical sectors from the host, and is configured to, in response to the write command, clear bits corresponding to the one or more logical sectors in the lower-level bitmap loaded from the memory device, and complete a write operation for the one or more logical sectors.

11. The storage device of claim 10, wherein the controller is configured to clear a bit corresponding to a logical group including the one or more logical sectors when the bit corresponding to the logical group including the one or more logical sectors is set in the upper-level bitmap loaded from the memory device.

12. A storage device comprising:
a memory device configured to store data; and
a controller configured to control the memory device, layer a logical address space used in a host into upper regions and lower regions, each upper region comprising a plurality of lower regions, and store validity state information for each upper region indicative of whether or not all of the lower regions included in the upper region are valid or not valid,
wherein the controller is configured to:
determine, using the validity state information for each upper region, a first upper region of the upper regions that is invalid and that includes a target logical address region to which a trimming operation is to be performed, and
store, in the memory device, a trim log including address information based on a determination that the target logical address region also addresses a second upper region, and perform the trimming operation by inactivating the target logical address region.

13. The storage device of claim 12, wherein the controller is further configured to:
store invalid information for each lower region, and
store, in the memory device, the invalid information for each upper region and the invalid information for each lower region.

14. The storage device of claim 13, wherein the controller is configured to load the invalid information for each upper region, the invalid information for each lower region, and the trim log stored in the memory device and restore the invalid information for each upper region and the invalid information for each lower region based on the address information included in the trim log, in response to a supply of power to the storage device being resumed after the storage device is abnormally terminated.

15. The storage device of claim 12, wherein the controller is configured to receive a sanitize command from the host, determine the entire logical address space as the target logical address region in response to the sanitize command, and performs the trimming operation on the entire logical address space.

16. A storage device comprising:
a memory device configured to store a lower-level bitmap indicating whether or not logical sectors are invalid in a host and an upper-level bitmap indicating whether or not logical groups each including consecutive logical sectors are invalid; and
a controller configured to control the memory device and including a log buffer,
wherein the controller is configured to:
receive a sanitize command for an entire user region of the memory device from the host and perform a deletion operation on the entire user region,
scan the upper-level bitmap loaded from the memory device to find one or more logical groups that are not invalid and generate trim logs for the one or more logical groups, and
invalidate all of the logical sectors, provide a completion response to the sanitize command to the host, and store the generated trim logs in the memory device.

17. The storage device of claim 16, wherein the controller is configured to skip generation of trim logs for logical groups that are invalid.

18. The storage device of claim 16, wherein the controller is configured to invalidate all of the logical sectors by setting to a first value all of bits of the lower-level bitmap and the upper-level bitmap loaded from the memory device.

19. The storage device of claim 16, wherein the controller is configured to perform a deletion operation on the entire user region by controlling an erase operation of memory blocks allocated to the user region among memory blocks included in the memory device.

20. The storage device of claim 16, wherein the controller is configured to perform a deletion operation on the entire user region by deleting or changing an encryption key applied to data of the user region.

* * * * *